US008526175B2

(12) United States Patent
Yukawa et al.

(10) Patent No.: US 8,526,175 B2
(45) Date of Patent: Sep. 3, 2013

(54) INFORMATION PROCESSING DEVICE

(75) Inventors: Shuhei Yukawa, Nagano (JP); Hiroyuki Ozawa, Tokyo (JP); Hidetoshi Kawabe, Tokyo (JP)

(73) Assignee: Sony Corporation, Tokyo (JP)

( * ) Notice: Subject to any disclaimer, the term of this patent is extended or adjusted under 35 U.S.C. 154(b) by 259 days.

(21) Appl. No.: 12/847,322

(22) Filed: Jul. 30, 2010

(65) Prior Publication Data

US 2011/0057894 A1 Mar. 10, 2011

(30) Foreign Application Priority Data

Sep. 7, 2009 (JP) ................ P2009-205830
Oct. 2, 2009 (JP) ................ P2009-230757

(51) Int. Cl.
*G06F 1/16* (2006.01)
(52) U.S. Cl.
USPC ............ 361/679.37; 361/679.33; 361/679.38; 361/679.34; 361/679.35
(58) Field of Classification Search
USPC ................ 361/679.3–679.41, 741, 756, 760, 361/679.01–679.41, 679.55–679.59, 724–727; 312/223.1, 223.2
See application file for complete search history.

(56) References Cited

U.S. PATENT DOCUMENTS

| | | | | |
|---|---|---|---|---|
| 5,801,922 A | * | 9/1998 | Shen et al. ............... | 361/679.32 |
| 6,021,041 A | * | 2/2000 | Genix et al. ............. | 361/679.34 |
| 6,166,917 A | * | 12/2000 | Anderson .................. | 361/756 |
| 6,252,768 B1 | * | 6/2001 | Lin ........................... | 361/679.34 |
| 6,442,637 B1 | * | 8/2002 | Hawkins et al. ........... | 710/300 |
| 6,452,787 B1 | * | 9/2002 | Lu et al. ................... | 361/679.38 |
| 6,606,241 B2 | * | 8/2003 | Moore ....................... | 361/679.58 |
| 7,170,742 B2 | * | 1/2007 | Na et al. ................... | 361/679.32 |
| 2003/0235031 A1 | * | 12/2003 | Lo ............................. | 361/685 |
| 2005/0229193 A1 | | 10/2005 | Omori et al. | |
| 2010/0053881 A1 | * | 3/2010 | Watanabe ................ | 361/679.33 |

FOREIGN PATENT DOCUMENTS

| | | |
|---|---|---|
| JP | 1-268224 | 10/1989 |
| JP | 2002/251259 | 9/2002 |
| JP | 2003-330603 | 11/2003 |
| JP | 2005/251363 | 9/2005 |
| JP | 2007-72501 | 3/2007 |

\* cited by examiner

*Primary Examiner* — Jayprakash N Gandhi
*Assistant Examiner* — Nidhi Desai
(74) *Attorney, Agent, or Firm* — Oblon, Spivak, McClelland, Maier & Neustadt, L.L.P.

(57) ABSTRACT

An information processing device includes: a casing including a side surface having an opening part and a bottom surface orthogonal to the side surface; a frame provided at the bottom surface; a disk drive main body capable of being attached to and detached from the frame through the opening part; a disk tray which is operable to hold a disk, is capable of being inserted into and drawn out of the disk drive main body through the opening part, and has a hatch operable to close the opening part when the disk tray is inserted in the disk drive main body; and a coupling part through which the frame and the disk drive main body are coupled to each other in the vicinity of the opening part.

3 Claims, 21 Drawing Sheets

INFORMATION PROCESSING DEVICE

BACKGROUND OF THE INVENTION

1. Field of the Invention

The present invention relates to an assembly structure for an information processing device. Besides, the invention relates to an information processing device, such as a personal computer, which has a touch panel at a screen.

2. Description of the Related Art

In information processing devices such as personal computers, a disk drive for driving disk media such as CD (Compact Disc), DVD (Digital Versatile Disk) or BD (Blu-ray Disc) is mounted, in many cases. Where the disk drive is incorporated in a casing of the information processing device, it is common that a unitized disk drive is fixed to the casing by screwing. In such a case, the disk drive can be demounted from the casing by releasing the fixation.

A disk drive has a mechanical mechanism such as a motor for rotating a disk and, hence, is more susceptible to failure than other component parts not having such a mechanism. If the disk drive can be easily mounted to and demounted from the casing, it is easy to replace or repair the disk drive. On the other hand, in order to stably operate the mechanical mechanism, it may be necessary to securely fix the disk drive to the casing. Accordingly, it is desirable that the disk drive is fixed to the casing at a plurality of locations at the periphery of the disk drive.

For instance, Japanese Patent Laid-open No. 2005-251363 (paragraph [0106], FIG. 16) (hereinafter referred to as Patent Document 1) discloses a configuration in which a disk drive device is screwed to an apparatus body of a personal computer by passing screws through a plurality of fixed pieces provided on the disk drive device. The fixed pieces are disposed near the four corners of the disk drive device which is rectangular plate-like in shape.

As a touch panel mounted on a display provided in an information processing device such as a personal computer, those based on various detection principles such as infrared system, capacitance system, and resistor film system, have been put to practical use. The touch panels of the infrared system are lower than those of the other detection systems in the cost for enlarging the detection range, and are therefore frequently adopted for comparatively large type displays.

In the touch panel of the infrared system, infrared rays are radiated along the screen of the display, and the blockade of the infrared rays by an interceptive body such as a user's finger pointing a position on the screen is detected, whereby the position of the interceptive body on the screen is determined. The touch panels of the infrared system include those of an infrared reflection type in which reflection of infrared rays is utilized.

The touch panel of the infrared reflection type is provided with a detector for radiating and detecting infrared light and a reflecting member for reflecting the infrared light. In general, two such detectors are used, which are disposed respectively in two corner areas of the screen. Each of the detectors has a light emitting part for emitting infrared light and a light receiving part for receiving the infrared light. The infrared light emitted from the light emitting part is periodically changed in optical axis direction by a scanning mechanism, and is radiated in a predetermined angle range (e.g., in a range of 90°). The reflecting member is disposed at positions along three edges of the screen, namely, at positions corresponding to the radiating range of the infrared lights from the two detectors.

The reflecting member has a retroreflective ability (an ability to reflect the incident light in the same direction as the direction of incidence), and reflects the incident infrared lights toward the detectors. The light receiving part of the detector outputs an electrical signal according to the intensity of the infrared light received. In the tough panel of the infrared reflection type, the two signals outputted from the light receiving parts of the two detectors are used to thereby determine the position (coordinates) of an interceptive body on the screen. Specifically, when an interceptive body is present on the screen, the infrared lights are blocked by the interceptive body, whereon the levels of the signals obtained from the light receiving parts correspondingly to the quantities of infrared lights reflected are lowered. In this instance, based on the information on two scan angles obtained from scanning mechanisms in the detectors, the position (coordinates) of the interceptive body on the screen is determined.

Examples of the known technology in which a touch panel of the infrared reflection type as above-mentioned is adopted includes a coordinate input device including a retroreflective body provided on an edge of a CRT and a scanning-type light emitter-receiver opposed to the retroreflective body (refer to, for example, Patent Document 1).

SUMMARY OF THE INVENTION

In the structure in which a disk drive is fixed to a casing at a plurality of locations of its periphery, however, it may be necessary to disassemble the casing for demounting/mounting of the disk drive, so that replacement of the disk drive imposes a burden, particularly, on a general user. On the other hand, a configuration may be contemplated in which screws for fixing the disk drive are disposed to penetrate the casing, so that the screws fixing the disk drive can be untightened and removed by an operation external to the casing. In this case, however, the screws for fixing the disk drive to the casing are exposed at the surface of the casing, which may impair the appearance of the information processing device.

Thus, there is a need for an information processing device having such a disk drive mounting structure that replacement of a disk drive is facilitated and that screws are not exposed to the appearance of a casing.

Besides, Japanese Patent Laid-open No. 2007-72501 (paragraph [0043], FIG. 1) discloses a coordinate input device in which a retroreflective body is exposed at the periphery of a screen. Such a retroreflective body has a problem in that a wavy pattern or the like may appear on the surface thereof and that its own color tone may be limited. Therefore, in the case where a design with the retrorfelective body exposed at the periphery of the screen is adopted as in the apparatus described in Patent Document 1, the appearance of the apparatus may be impaired. In addition, the retroreflective body being exposed may be stained or damaged, resulting in a lowering in detection accuracy of the coordinates of the position pointed.

Thus, there is a need for an information processing device in which it is possible to prevent appearance from being lowered by a reflecting member, to protect the reflecting member, and to realize an enhanced strength of a bezel of a screen.

According to an embodiment of the present invention, there is provided an information processing device which includes a casing, a frame, a disk drive main body, a disk tray, and a coupling part.

The casing has a side surface provided with an opening part and a bottom surface orthogonal to the side surface.

The frame is provided at the bottom surface.

The disk drive main body can be attached to and detached from the frame through the opening part.

The disk tray is operable to hold a disk, is capable of being inserted into and drawn out of the disk drive main body through the opening part, and has a hatch operable to close the opening part when the disk tray is inserted in the disk drive main body.

The coupling part couples the frame and the disk drive main body to each other in the vicinity of the opening part, the coupling part is covered with the hatch when the disk tray is inserted in the disk drive main body, and the coupling part is exposed when at least a part of the disk tray is ejected from the disk drive main body.

The disk drive main body is detachably attached to the casing through the frame. In the condition where at least a part of the disk tray is ejected from the disk drive main body and the hatch is separated from the opening part, the coupling part for coupling the frame and the disk drive to each other is exposed, so that the coupling can be released. In other words, decoupling can be achieved by only ejecting the disk tray, without needing disassembly of the casing or the like work. In the condition where the disk tray is accommodated in the disk drive main body, on the other hand, the coupling part does not appear to the appearance and, hence, aesthetic quality of the information processing device is not impaired.

The coupling part may include a first coupling part and a second coupling part; and the first coupling part and the second coupling part may be disposed at both ends of the opening part which are on opposite sides of the disk tray.

A motor for rotating a disk is incorporated in the disk drive main body, and a reaction of a torque exerted on the disk is applied to the disk drive main body. With the frame and the disk drive main body coupled to each other by the first coupling part and the second coupling part on both sides of the disk tray, firm fixation of the disk drive main body to the frame can be realized.

The coupling part may have a screw or screws passed through the disk drive main body and the frame, and the screw or screws may be passed in a direction perpendicular to the bottom surface.

Where the screw or screws for coupling the disk drive main body and the frame to each other are disposed in the direction perpendicular to the bottom surface, a tool such as a screw driver can be prevented from interfering with the disk tray at the time of putting the screw(s) into screw engagement or at the time of releasing the screw engagement.

The frame may be mounted to the bottom surface, with an elastic member interposed therebetween.

Vibrations from the casing are attenuated by the elastic member, transmission of the vibrations to the frame is prevented and, hence, transmission of the vibrations to the disk drive main body fixed to the frame is prevented. While vibrations generated for example by a speaker accommodated in the casing may exert an influence on a reading operation of the disk drive or the like, this problem can be obviated by the configuration involving the elastic member.

The frame may have a pair of guide grooves formed along the mounting/demounting direction of the disk drive main body, and the disk drive main body may have a pair of engaging parts for engagement with the guide grooves.

At the time of insertion of the disk drive into the frame, the engaging parts provided on the disk drive main body are engaged with the guide grooves provided in the frame, whereby sliding of the disk drive is guided. As a result, the position of the disk drive relative to the frame is regulated, and connection of a connector or the like is facilitated. In addition, the engagement between the guide grooves and the engaging parts assists the coupling between the disk drive and the frame through the coupling part, whereby the disk drive can be assuredly fixed to the frame.

The coupling part may further include a stud provided on the frame, a screw hole provided in the disk drive main body, and an urging member which is disposed between the screw and the stud and is operable to urge the screw in a direction opposite to the direction in which the screw is inserted.

Since the screw is being urged by the urging member, it is prevented from slipping off through loosening.

According to another embodiment of the present invention, there is provided an information processing device which includes a casing, a hexagon stud, a first component part, a screw, and a second component part.

The casing has a boss part provided with a first screw hole.

The hexagon stud is provided at its one end with a first screw shaft to be screw engaged with the first screw hole, and is provided at its other end with a second screw hole.

The first component part has a first through-hole through which the first screw shaft can be passed, and the first component part is fixed to the casing by the process in which the first screw shaft of the hexagon stud is screw engaged with the first screw hole in the boss part through the first through-hole.

The screw has a second screw shaft which is screw engaged with the second screw hole and which is smaller than the first screw shaft in diameter.

The second component part has a second through-hole through which the second screw shaft can be passed, and the second component part is fixed to the casing by the process in which the second screw shaft of the hexagon stud is screwed into the second screw hole in the hexagon stud through the second through-hole.

Since the diameter of the second screw shaft is smaller than the diameter of the first screw shaft, the torque required for releasing the screw engagement between the second screw shaft and the second screw hole is smaller than the torque necessary for releasing the screw engagement between the first screw shaft and the first screw hole. Therefore, when the second screw shaft is rotated in a direction for releasing the screw engagement, only the screw engagement between the second screw shaft and the second screw hole is released, without causing release of the screw engagement between the first screw shaft and the first screw hole. This ensures that, at the time of detaching the second component part from the casing, the first component part can be prevented from being detached from the casing.

According to a further embodiment of the present invention, there is provided an information processing device which includes a casing, a hexagon stud, a first component part, a screw, and a second component part.

The casing has a boss part provided with a first screw hole.

The hexagon stud is provided at its one end with a first screw shaft to be screwed into the first screw hole, and is provided at its other end with a second screw hole.

The first component part has a first through-hole through which the first screw shaft can be passed, and the first component part is fixed to the casing by the process in which the first screw shaft of the hexagon stud is screwed into the first screw hole in the boss part through the first through-hole.

The screw has a second screw shaft to be screwed into the second screw hole.

The second component part has a second through-hole through which the second screw shaft can be passed, and the second component part is fixed to the casing by the process in which the second screw shaft of the hexagon stud is screwed into the second screw hole in the hexagon stud through the second through-hole.

The rotating direction for screw engagement between the first screw shaft and the first screw hole is opposite to the rotating direction for screw engagement between the second screw shaft and the second screw hole.

Since the rotating direction for screw engagement between the second screw shaft and the second screw hole and the rotating direction for screw engagement between the first screw shaft and the first screw hole are opposite to each other, it is ensured that when the second screw shaft is rotated in the direction for releasing the screw engagement, only the screw engagement between the second screw shaft and the second screw hole is released, without causing release of the screw engagement between the first screw shaft and the first screw hole. Accordingly, at the time of detaching the second component part from the casing, the first component part can be prevented from being detached from the casing.

The first component part may be a mother board on which to mount electronic parts, and the second component part may be a shield plate for preventing electromagnetic interference (EMI) from the electronic parts.

The hexagon stud provides electrical connection between the mother board and the shield plate, so that the shield plate can be used as a ground.

According to yet another embodiment of the present invention, there is provided an information processing device which includes a display unit, a plurality of detectors, a coordinate detecting unit, a reflecting member, and a bezel.

The display unit has a screen.

The detectors are provided at a peripheral edge of the screen in a plurality of positions spaced from each other. The detectors each radiate light in a predetermined wavelength band including an invisible region along the screen, and each detect the reflected light of the radiated light.

The coordinate detecting unit detects the coordinates of a pointed position on the screen, based on the results of detection by the plurality of detectors.

The reflecting member is disposed selectively along the peripheral edge of the screen, and has a retroreflective ability for reflecting the light coming from the detecting part.

The bezel is formed of a selectively transmitting material for controlling the quantity of light in a visible region transmitted therethrough, and includes a first part decoratively surrounding the periphery of the screen and a second part extended from the first part so as to shield the detectors and the reflecting member from each other.

In the embodiment of the present invention, while transfer of light between the detectors and the reflecting member is permitted by the second part of the bezel formed of the selectively transmitting material which limits the quantity of light in a visible region transmitted therethrough, a bad influence of exposure of the reflecting member on the appearance of the information processing device can be prevented. In addition, the accuracy of detection of the coordinates can be prevented from being lowered due to contamination or damaging of the reflecting member. Further, the extension of the second part from the first part promises an enhanced strength of the bezel.

The reflecting member may be fixed to a support member provided at a peripheral edge part of the screen.

This configuration makes it possible to support the reflecting member by the support member. Since the bezel and the reflecting member are supported independently, it is ensured that even in the case where the bezel is deformed by an external force or heat or the like, the reflection of light by the reflecting member is not influenced, and the position of an interceptive body can be detected accurately.

The reflecting member may be fixed to the second part of the bezel.

According to this configuration, the reflecting member is fixed directly to the second part of the bezel, whereby the influence of refraction of light by an air layer can be reduced. In addition, the length of an optical path can be shortened and attenuation of light can therefore be suppressed, as compared with the case where a gap is present between the reflecting member and the second part of the bezel. Furthermore, a more reduced bezel size can be realized, as compared with the case where the reflecting member is fixed to the support member.

The reflecting member may be fixed to the bezel with a light-transmitting adhesive.

This configuration makes it possible to suppress the attenuation of light due to the presence of the adhesive.

The information processing device may further include a receiver part capable of receiving an optical signal from a remote controller, and the first part of the bezel may cover the receiver part.

This configuration makes it possible for the bezel to be used as a cover for the receiver part. Since the bezel limits the quantity of light in a visible region transmitted therethrough, the bezel can be utilized as a cover for the receiver part. Therefore, it is unnecessary to provide other component part as an operating signal receiving part, so that the bezel can be formed in a seamless design, and the number of component parts can be reduced.

Thus, according to embodiments of the present invention, it is possible to provide an information processing device having such a disk drive mounting structure that replacement of a disk drive is facilitated and, yet, a screw or screws are not exposed to the appearance of a casing.

In addition, it is possible to provide an information processing device in which a lowering in appearance quality due to a reflecting member can be obviated, the reflecting member can be protected, and an enhanced strength of a bezel at a screen can be promised.

DETAILED DESCRIPTION OF THE PREFERRED EMBODIMENTS

Figure 1A:
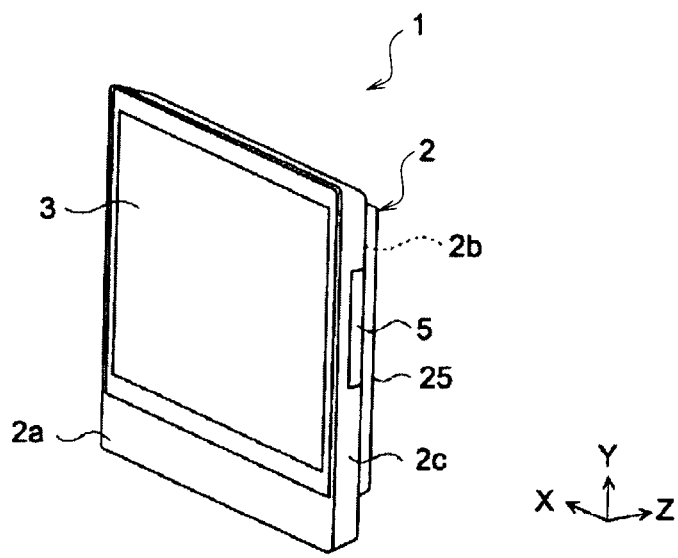
FIGS. 1A and 1B each illustrate an appearance of an information processing device according to an embodiment of the present invention.

Now, embodiments of the present invention will be described below referring to the drawings.

In the drawings, an X-direction, a Y-direction orthogonal to the X-direction, and a Z-direction orthogonal to both the X-direction and the Y-direction are shown.

(First Embodiment)
<Configuration of Information Processing Device>

Figure 1B:
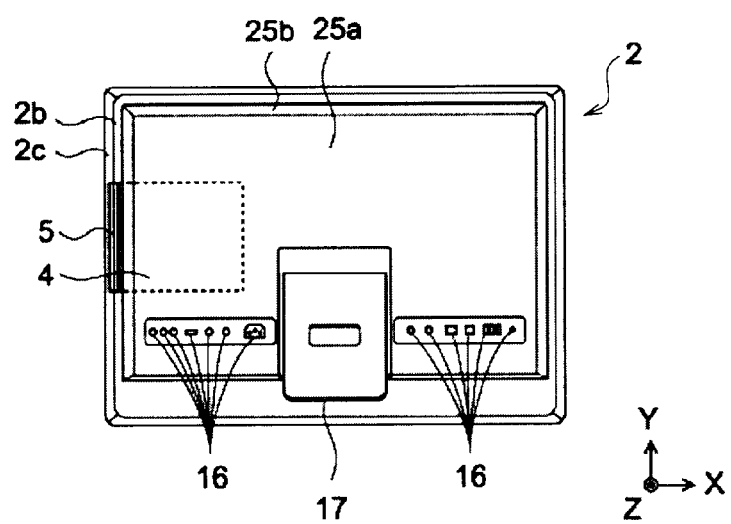

FIGS. 1A and 1B each illustrate an appearance of an information processing device 1 according to an embodiment of the present invention.

FIG. 1A is a perspective view, from the face side, of the information processing device 1, and FIG. 1B is a plan view, from the back side, of the information processing device 1. The information processing device 1 has a display and a personal computer main body united to each other. The information processing device 1 has a casing 2, and an LCD (Liquid Crystal Display) 3 is provided at one surface of the casing 2. A CPU (Central Processing Unit), a memory, an HDD (Hard Disk Drive), an input-output interface and the like are accommodated in the casing 2. In addition, the information processing device 1 has a disk drive 4. Incidentally, the configuration of the information processing device 1 is not limited to the one shown here.

The casing 2 includes a face-side surface 2a provided with the LCD 3, a back-side surface 2b on the side opposite to the face-side surface 2a, and a side surface 2c. It is assumed that the face-side surface 2a and the back-side surface 2b are each on an X-Y plane, while the side surface 2c is substantially on a Y-Z plane. A hatch 5 of the disk drive 4 is provided to range from the side surface 2c to the back-side surface 2b of the casing 2. In other words, the hatch 5 constitutes a part of the side surface 2c and a part of the back-side surface 2b. At the back-side surface 2b, a rear cover 25 is provided which is bulged in the Z-direction from the back-side surface 2b. The rear cover 25 includes a flat surface part 25a parallel to the X-Y plane, and a slant surface part 25b interconnecting the flat surface part 25a and the back-side surface 2b. Connection terminals 16 for a power source, a LAN (Local Area Network), an input device, etc. and a stand 17 for erecting the casing 2 are provided at the flat surface part 25a.

Figure 2A:
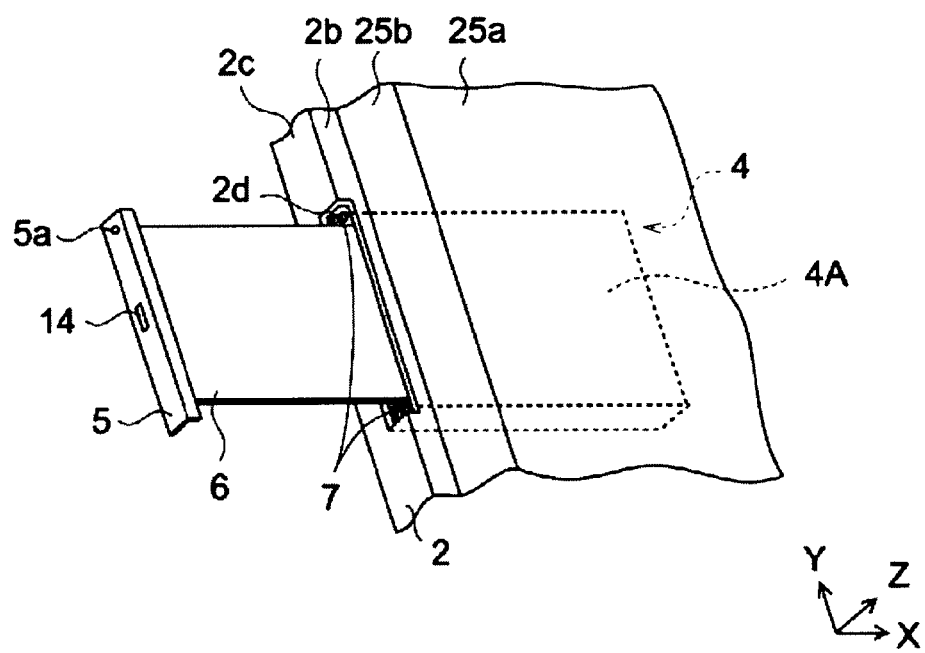
FIGS. 2A and 2B illustrate a disk drive mounted to the information processing device.
Figure 2B:
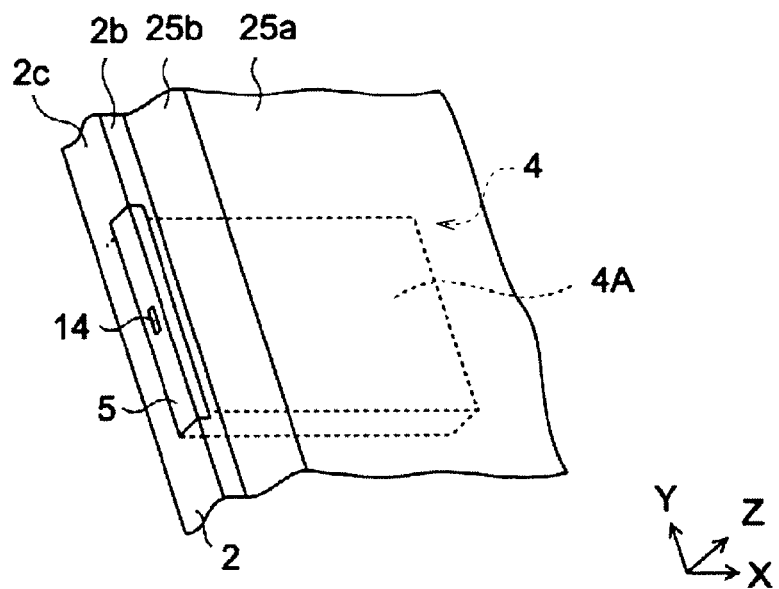

FIGS. 2A and 2B are perspective views of the disk drive 4. The disk drive 4 is a drive for disk media (removable media) such as CD (Compact Disc), DVD (Digital Versatile Disk) or BD (Blu-ray Disc), and is a tray-type drive in which a disk tray 6 with a disk mounted thereon is slid in the X-direction from the casing 2. The disk drive 4 includes a disk drive mechanism, a pick-up and the like which are not shown, and reads information from the disk accommodated therein or records information onto the disk by rotating the disk on an X-Y plane and radiating laser light or the like onto the disk. A button 14 for ejecting the disk tray 6 is provided at the hatch 5. In addition, the disk tray 6 is so configured that even in the case where the power source for the information processing device 1 is OFF, by operating an eject pin insertion hole 5a provided at the hatch 5.

FIG. 2A illustrates the condition where the disk tray 6 is ejected. FIG. 2B shows the condition where the disk tray 6 is accommodated. The hatch 5 is fixed to the tip of the disk tray 6, and is moved attendant on a movement of the disk tray 6. In the condition where the disk tray 6 is ejected from the casing 2 as shown in FIG. 2A, the hatch 5 is separated from the casing 2, forming an opening 2d. In the condition where the disk tray 6 is accommodated in the casing 2 as shown in FIG. 2B, the hatch 5 is in abutment on the casing 2, and the opening 2d is thereby closed.

When a signal for ejecting the disk tray 6 is inputted to the disk drive 4 from the button 14 or the like in the condition where the disk tray 6 is accommodated as shown in FIG. 2B, the disk tray 6 and the hatch 5 are moved, whereby the disk tray 6 is ejected. As a result, the disk tray 6 is ejected as shown in FIG. 2A. In this condition, a disk is taken out from the disk tray 6 or is mounted onto the disk tray 6. When a signal for accommodating the disk tray 6 is inputted to the disk drive 4, the disk tray 6 and the hatch 5 are moved, whereby the disk tray 6 is accommodated as shown in FIG. 2B. In this condition, information is read from the disk or written onto the disk.

Though details will be described later, the disk drive 4 is fixed to the casing 2 by two drive fixing screws 7. The drive fixing screws 7 are disposed one each at a position which is located at an end portion on the opening 2d side of the disk drive 4 and which is deviated in the Y-direction from a moving path of the disk tray 6. In other words, the pair of drive fixing screws 7 are disposed at both ends in the Y-direction of the opening 2d which are on opposite sides of the disk tray 6. In the condition where the disk tray 6 is accommodated as shown in FIG. 2B, the drive fixing screws 7 are covered with the hatch 5 and are therefore invisible externally. In the condition where the disk tray 6 is ejected as shown in FIG. 2A, on the other hand, the hatch 5 is separated from the casing 2, so that the drive fixing screws 7 are exposed to the side of the back-side surface 2b.

Figure 3A:
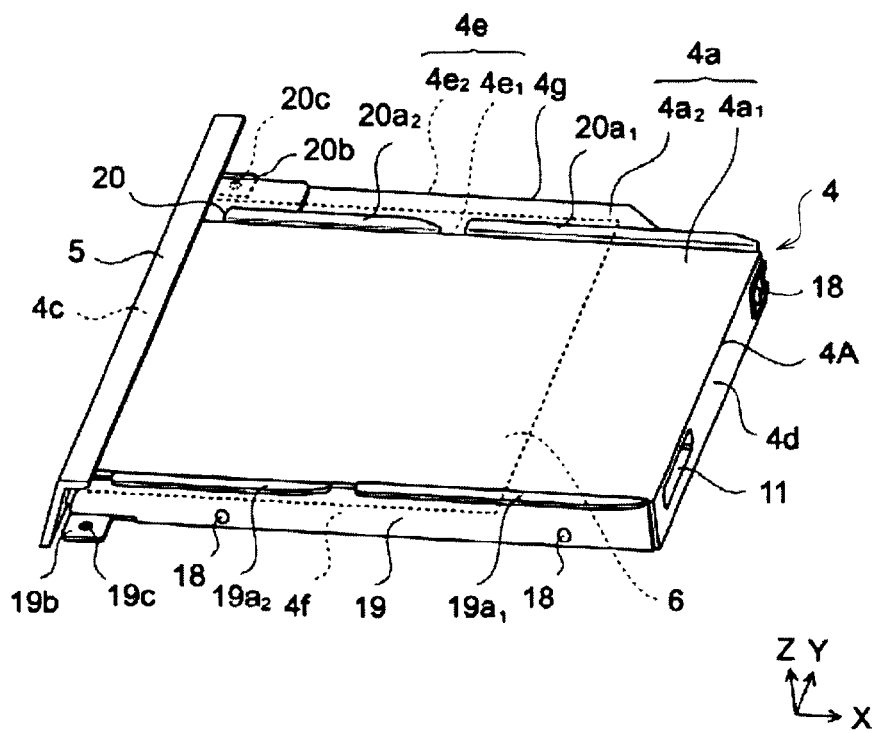
FIGS. 3A and 3B illustrate the disk drive.
Figure 3B:
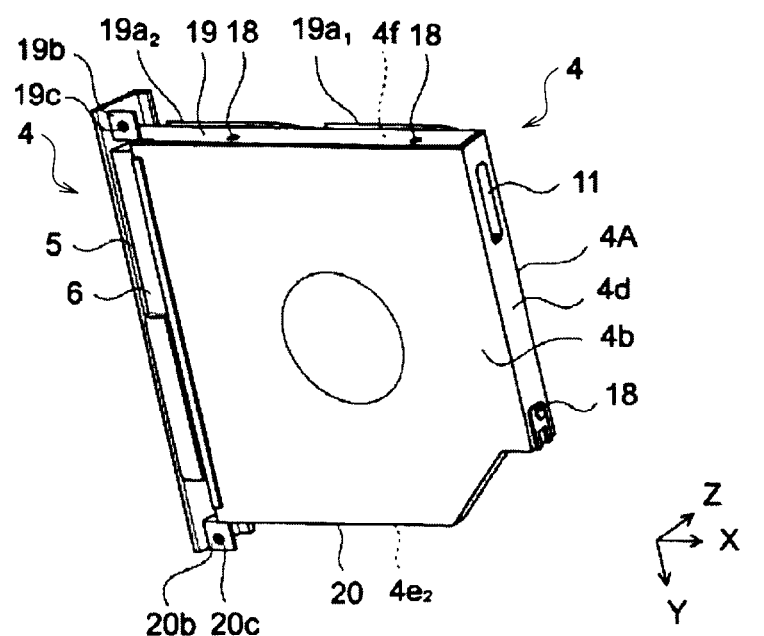

FIGS. 3A and 3B are perspective views illustrating the disk drive 4. FIG. 3A shows the disk drive 4 as viewed from the side of the back-side surface 2b, and FIG. 3B shows the disk drive 4 as viewed from the side of the face-side surface 2a. The disk drive 4 includes the hatch 5, the disk tray 6 to which the hatch 5 is fixed, and a disk drive main body 4A permitting the disk tray 6 to be accommodated and ejected in relation therewith. The disk tray 6 is so provided as to be slidable together with the hatch 5 in the X-direction relative to the disk drive main body 4A. The disk drive main body 4A is substantially in the shape of a rectangular parallelopiped having surfaces on an X-Y plane, a Y-Z plane and a Z-X plane. Of these surfaces of the disk drive main body 4A, the surface (X-Y plane) located on the side of the back-side surface 2b, in the condition where the disk drive main body 4A is mounted to the casing 2, will be referred to as an upper surface 4a, and the surface (X-Y plane) located on the opposite side as a lower surface 4b. In addition, the surface (X-Y plane) which is substantially orthogonal to the upper surface 4a and the lower surface 4b and which faces the hatch 5 will be referred to as a front surface 4c, and the surface (Y-Z plane) on the opposite side as a rear surface 4d. Further, the side surface (Z-X plane) on one side will be referred to as a side surface 4e, and the side surface (Z-X plane) on the opposite side as a side surface 4f.

The side surface 4e has a side surface $4e_1$ constituting a part of the side surface 4e, and a side surface $4e_2$ constituting a part on the lower surface 4b side of the side surface 4e. The side surface $4e_2$ is extended in the Y-direction, relative to the side surface $4e_1$. Thus, on the side surface $4e$ side of the disk drive main body 4A, an extension part $4g$ extended in the Y-direction from the side surface $4e_1$ is formed. The upper surface $4a$ has an upper surface $4a_1$, and an upper surface $4a_2$ constituting an upper surface of the extension part $4g$. The side surface $4e_1$ and the side surface $4e_2$ are separate from each other in the Y-direction, while the upper surface $4a_1$ and the upper surface $4a_2$ are separate from each other in the Z-direction. The disk drive main body 4A is mounted onto the casing 2 by being fixed to a frame 12 (see FIG. 4 to be described later) attached to the casing 2. The rear surface $4d$ is provided with a connector port 11 in which to insert a connector 10 to be described later.

The disk drive main body 4A is provided with two brackets 19 and 20 for mounting the disk drive 4 to the frame 12. The bracket 19 is a plate-shaped member which is fixed to the side surface $4f$ by screws 18 and which covers the side surface $4f$. The bracket 19 has engaging parts 19a and a screwing part 19b. The engaging parts 19a are disposed in plurality at positions corresponding to an edge where the side surface $4f$ and the upper surface $4a_1$ intersect each other. The engaging part located on the rear surface $4d$ side is referred to as an engaging part $19a_1$, and the engaging part located on the front surface $4c$ side is referred to as an engaging part $19a_2$. The engaging part $19a_1$ and the engaging part $19a_2$ are formed along the direction (X-direction) of mounting/demounting (described later) of the disk drive main body 4A. The engaging parts $19a_1$ and $19a_2$ are so formed as to protrude in the Y-direction in the same plane (X-Y plane) as the upper surface $4a_1$ from positions corresponding to an edge where the side surface $4f$ and the upper surface $4a_1$ intersect each other. The screwing part 19b is provided on the lower surface 4b side of an end part, on the front surface $4c$ side, of the bracket 19. The screwing part 19b is disposed in substantially the same plane (X-Y plane) as the lower surface 4b. The screwing part 19b is provided with a screw hole 19c formed with a screw groove for screw engagement with the drive fixing screw 7 to be described later.

The bracket 20 is a plate-shaped member which is fixed to the side surface $4e_1$ and the rear surface $4d$ by screws 18 and which covers a part of the side surface $4e_1$ and a part of the upper surface $4a_2$. The bracket 20 has engaging parts 20a and a screwing part 20b. The engaging parts 20a are provided in plurality at positions corresponding to an edge where the side surface $4e_1$ and the upper surface $4a_1$ intersect each other. The engaging part located on the side of the rear surface $4d$ is referred to as an engaging part $20a_1$, and the engaging part located on the side of the side surface $4c$ is referred to as an engaging part $20a_2$. The engaging parts $20a_1$ and $20a_2$ are so formed as to protrude in the Y-direction in the same plane (X-Y plane) as the upper surface $4a_1$ from positions corresponding to an edge where the side surface $4e_1$ and the upper surface $4a_1$ intersect each other. The screwing part 20b is provided on the lower surface 4b side of an end portion, on the front surface $4c$ side, of the bracket 20. The screwing part 20b is formed in the same plane (X-Y plane) as the lower surface 4b. The screwing part 20b is provided with a screw hole 20c formed with a screw groove for screw engagement with the drive fixing screw 7 to be described later.

Figure 4A:
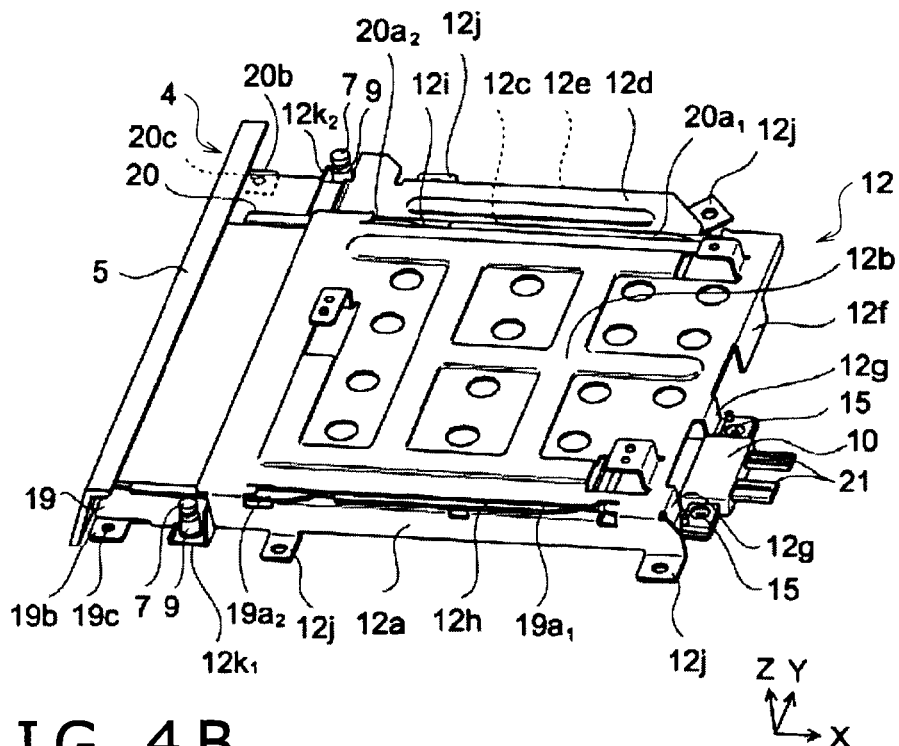
FIGS. 4A and 4B illustrate a frame and the disk drive.
Figure 4B:
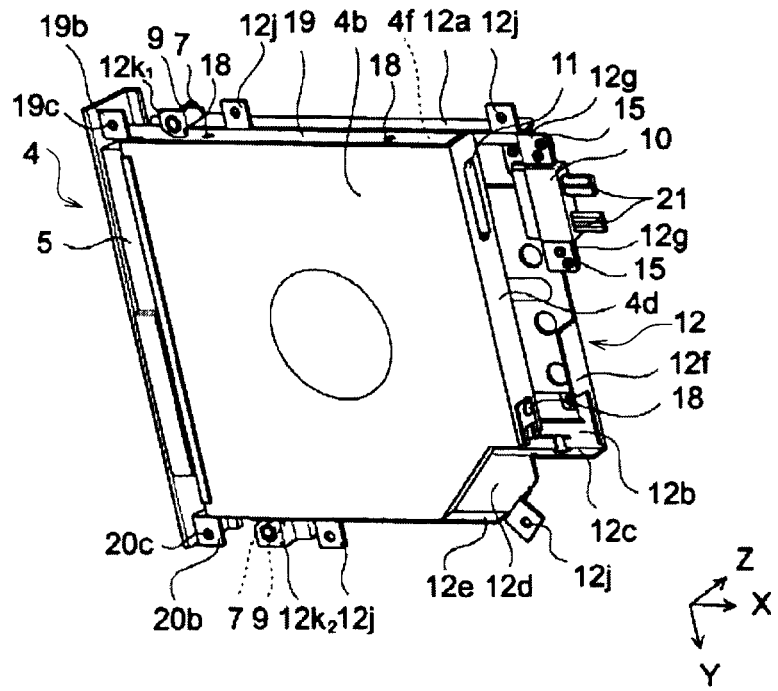

FIGS. 4A and 4B are perspective views showing the frame 12 and the disk drive 4. FIG. 4A shows the frame 12 and the disk drive 4 as viewed from the upper surface $4a$ side, and FIG. 4B shows the frame 12 and the disk drive 4 as viewed from the lower surface 4b side. Although the disk drive 4 is fixed to the frame 12 as will be described later, the disk drive 4 and the frame 12 in FIGS. 4A and 4B are shown in the condition where the disk drive 4 is not yet fully fixed to the frame 12 (in the condition where the disk drive 4 and the frame 12 are deviated from each other in the X-direction).

As shown in these figures, the frame 12 has such a shape as to cover the side surfaces $4e$ ($4e_1$, $4e_2$), the side surface $4f$ and the upper surfaces $4a$ ($4a_1$, $4a_2$) of the disk drive 4. In other words, the frame 12 includes a side surface part 12a corresponding to the side surface $4f$, an upper surface part 12b corresponding to the upper surface $4a_1$, a side surface part 12c corresponding to the side surface $4e_1$, an upper surface part 12d corresponding to the upper surface $4a_2$, and a side surface part 12e corresponding to the side surface $4e_2$. The side surface part 12a, the side surface part 12c and the side surface part 12e are plate-shaped parts substantially parallel to the Z-X plane, whereas the upper surface part 12b and the upper surface part 12d are plate-shaped parts substantially parallel to the X-Y plane.

The frame 12 is provided with a restricting part 12f and connector support parts 12g which are formed on the rear surface $4d$ side of the upper surface part 12b. The restricting part 12f is a plate-shaped part which is provided to be capable of abutment with the rear surface $4d$ of the disk drive 4 and which is parallel to the Y-Z plane. The connector support parts 12g support the connector 10 and fix it to the frame 12. A guide groove 12h is formed at a position corresponding to an edge where the side surface part 12a and the upper surface part 12b intersect each other, and a guide groove 12i is formed at a position corresponding to an edge where the upper surface part 12b and the side surface part 12c intersect each other. The guide groove 12h is an opening which penetrates the frame 12 and which is extended in the X-direction. The guide groove 12h is engaged with the engaging parts 19a of the bracket 19. The guide groove 12i is an opening which penetrates the frame 12 and which is extended in the X-direction. The guide groove 12i is engaged with the engaging parts 20a of the bracket 20.

The side surface part 12a of the frame 12 is provided with frame fixing parts 12j and a drive fixing part 12k (drive fixing part $12k_1$), and the side surface part 12e is provided with frame fixing parts 12j and a drive fixing part 12k (drive fixing part $12k_2$).

The frame fixing parts 12j are plate-shaped parts which are provided in plurality at end portions of each of the side surface part 12a and the side surface parts 12e and which are parallel to the X-Y plane. The frame fixing parts 12j are each provided with a hole through which to pass a screw, and the frame 12 is fixed to the casing 2 by fastening the screws passed through the holes.

The drive fixing part $12k_1$ is provided at an end part, on the hatch 5 side, of the side surface part 12a. Similarly, the drive fixing part $12k_2$ is provided at an end portion, on the hatch 5 side, of the side surface part 12e. The drive fixing parts $12k_1$ and $12k_2$ are plate-shaped parts parallel to the X-Y plane. The drive fixing parts $12k_1$ and $12k_2$ are each provided with a stud 9 and the drive fixing screw 7 which are to be described later. The drive fixing part $12k_1$, the screwing part 19b, the stud 9 and the drive fixing screw 7 which are provided at the drive fixing part $12k_1$, and the like constitute a first coupling part. The drive fixing part $12k_2$, the screwing part 20b, the stud 9 and the drive fixing screw 7 which are provided at the drive fixing part $12k_2$, and the like constitute a second coupling part.

Figure 5:
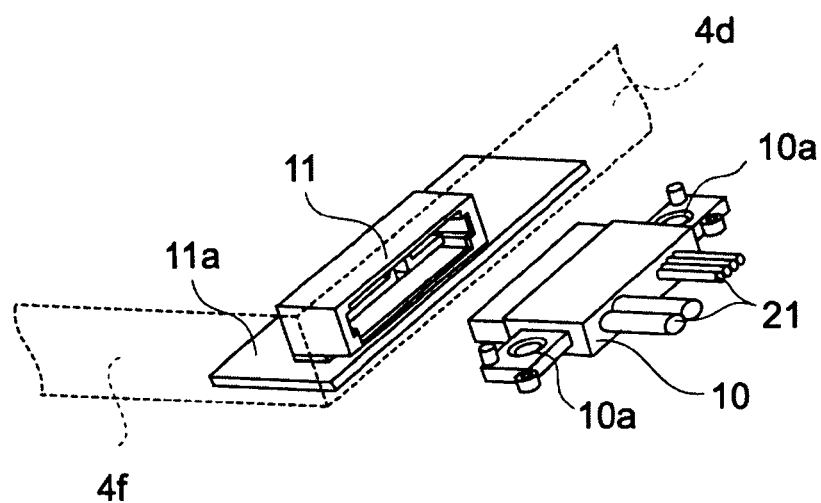
FIG. 5 illustrates details of a connector and a connector port.
Figure 5:
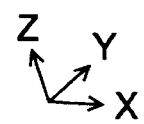

The connector 10 is attached to the connector support parts 12g of the frame 12. FIG. 5 illustrates the details of the connector 10 and the connector port 11. The connector 10 has a shape compatible with the connector port 11 in the disk drive 4. When the disk drive 4 is slid in the X-direction, as described later, relative to the frame 12 and is fixed in a predetermined position, the connector 10 is disposed at a position for insertion into the connector port 11. The connector 10 has screw holes 10*a*, and is fixed to the connector support parts 12*g* by screws 15 passed through the screw holes 10*a*. A cable 21 to be connected to a disk drive interface of the information processing device 1 is extended from the connector 10. The connector port 11 is fixed to a connector substrate 11*a* incorporated in the disk drive 4, and has a screw (not shown) to be electrically connected to the connector 10.

Mounting of the disk drive 4 to the frame 12 will now be described.

Figure 6A:
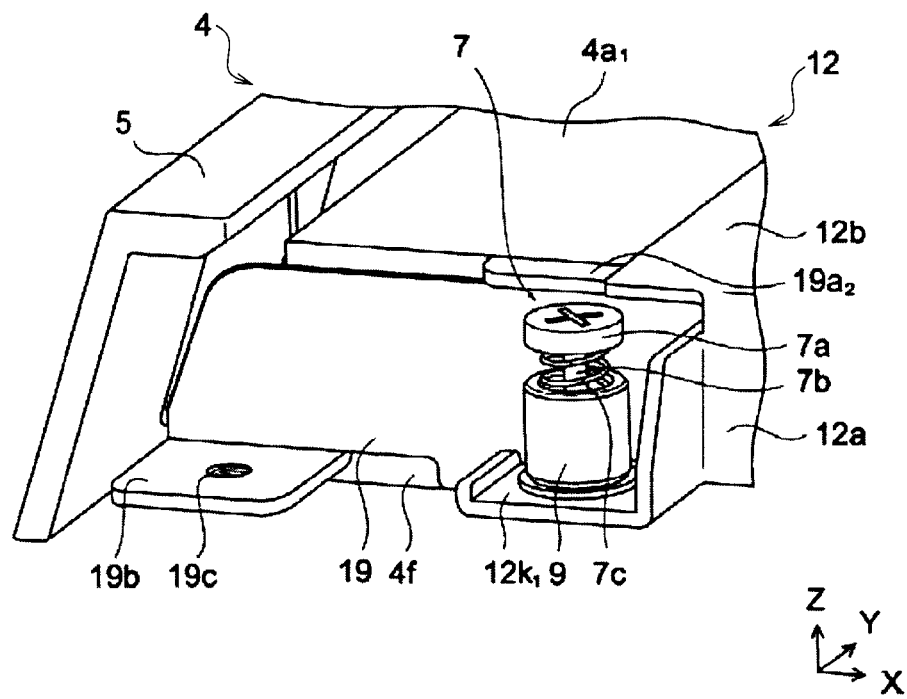
FIGS. 6A and 6B illustrate details of a coupling part.
Figure 6B:
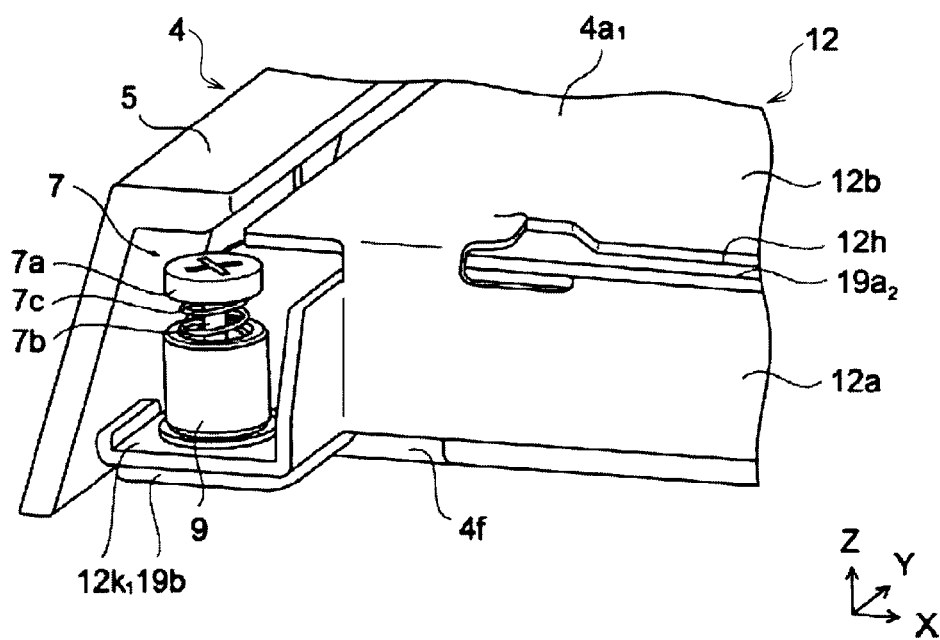

FIGS. 6A and 6B illustrate the details of the coupling part (first coupling part). FIG. 6A shows the condition where the disk drive 4 is deviated from the frame 12 in the X-direction, and FIG. 6B shows the condition where the disk drive 4 is aligned to the frame 12.

At the time of mounting the disk drive 4 to the frame 12, the disk drive 4 is inserted into the frame 12 from the rear surface 4*d* side. Then, the disk drive 4 is slid in the X-direction relative to the frame 12 (see FIGS. 4A, 4B and 6A). In this case, as shown in FIGS. 4A and 4B, the engaging parts 19$a_1$, etc. of the bracket 19 are engaged with the guide groove 12*h*, and the engaging parts 20$a_1$, etc. of the bracket 20 are engaged with the guide groove 12*i*, and the disk drive 4 is slid in the X-direction.

When the disk drive 4 is further slid in the X-direction starting from the condition shown in FIG. 6A, the screwing parts 19*b* and 20*b* come to overlap with the drive fixing parts 12*k* in the Z-direction, and the positions of the screw holes 19*c* and 20*c* in the X-Y plane coincide with those of the drive fixing screws 7 (FIG. 6B). Simultaneously, the rear surface 4*d* of the disk drive 4 abuts on the restricting part 12*f*, the connector port 11 accommodates the connector 10, and the disk drive 4 is positioned in the X-direction (FIG. 6B).

In this condition, the drive fixing screws 7 shown in FIG. 6B are turned, whereby the drive fixing parts 12$k_1$, 12$k_2$ and the screwing parts 19*b*, 20*b* of the disk drive 4 are screwed or fixed by the drive fixing screws 7. As a result, the frame 12 and the disk drive 4 are fixed. The disk drive 4 is assuredly fixed to the frame 12 by the screwing parts 19*b* and 20*b* and the drive fixing parts 12$k_1$ and 12$k_2$, and the connector 10 is inserted in the connector port 11, whereby the disk drive 4 is prevented from vibrating.

Figure 7A:
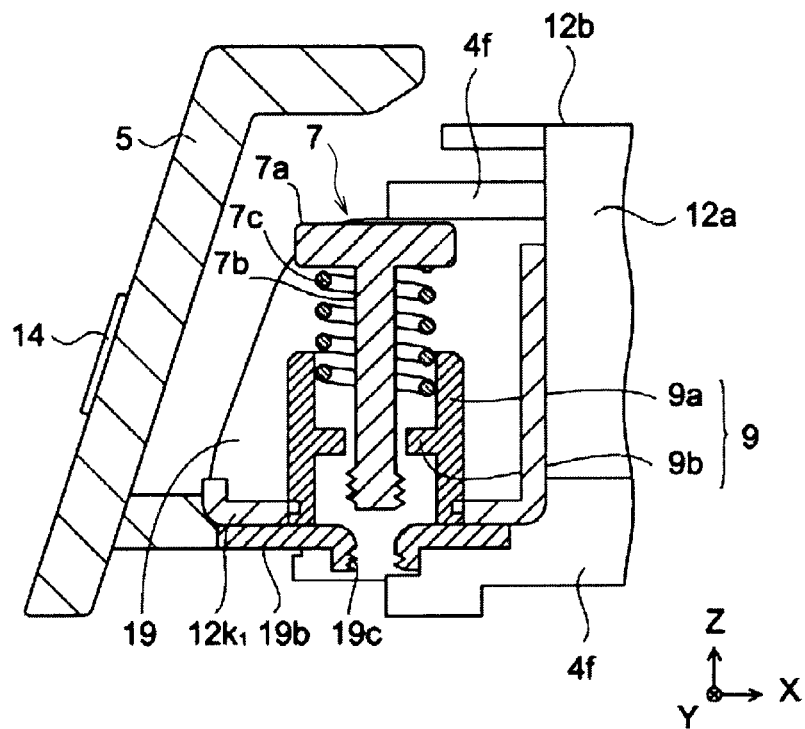
FIGS. 7A and 7B illustrate details of the coupling part.
Figure 7B:
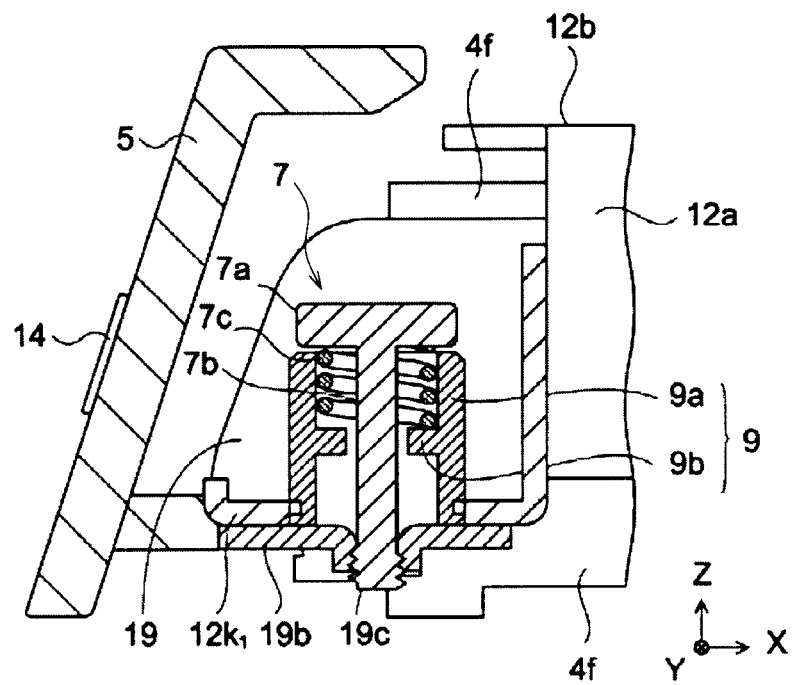

FIGS. 7A and 7B illustrate a configuration in the vicinity of the coupling part. FIG. 7A shows the condition where the drive fixing screw 7 is not put in screw engagement, whereas FIG. 7B shows the condition where the drive fixing screw 7 is in screw engagement.

As shown in FIG. 7A, the stud 9 is provided at the drive fixing part 12$k_1$ of the frame 12. The stud 9 includes a side wall part 9*a* and a lock part 9*b*. The side wall part 9*a* is cylindrical in shape, and is attached to the drive fixing part 12$k_1$ in the condition where a side peripheral surface thereof is perpendicular to the drive fixing part 12$k_1$. The drive fixing screw 7 can be passed inside the side wall part 9*a*. The lock part 9*b* is formed in a circular disk-like shape on the inner periphery side of the side wall part 9*a*, and is provided in its center with a hole in which to insert a screw shaft 7*b*.

The drive fixing screw 7 includes a screw head 7*a*, the screw shaft 7*b*, and a spring (urging member) 7*c*. The spring 7*c* is fixed at its one end to the screw head 7*a*, and is wound around the screw shaft 7*b*.

As shown in FIG. 7A, when the drive fixing screw 7 is rotated in the condition where the disk drive 4 is inserted in a position for fixation to the frame 12, the drive fixing screw 7 is screwed into the screw hole 19*c*, as shown in FIG. 7B. In this case, the spring 7*c* abuts on the lock part 9*b*, and is gradually compressed in the direction (Z-direction) in which the drive fixing screw 7 is inserted into the screw hole 19*c*. In the condition where the drive fixing screw 7 is in screw engagement with the screw hole 19*c* as shown in FIG. 7B, the drive fixing screw 7 is pressed by the elastic force of the spring 7*c* in the direction for rising in the Z-direction shown in FIG. 7B. In other words, the spring 7*c* urges (biases) the drive fixing screw 7 upward in the Z-direction. This prevents the drive fixing screw 7 from being loosened due to vibrations arising, for example, from the rotation of a disk in the disk drive 4.

Figure 8:
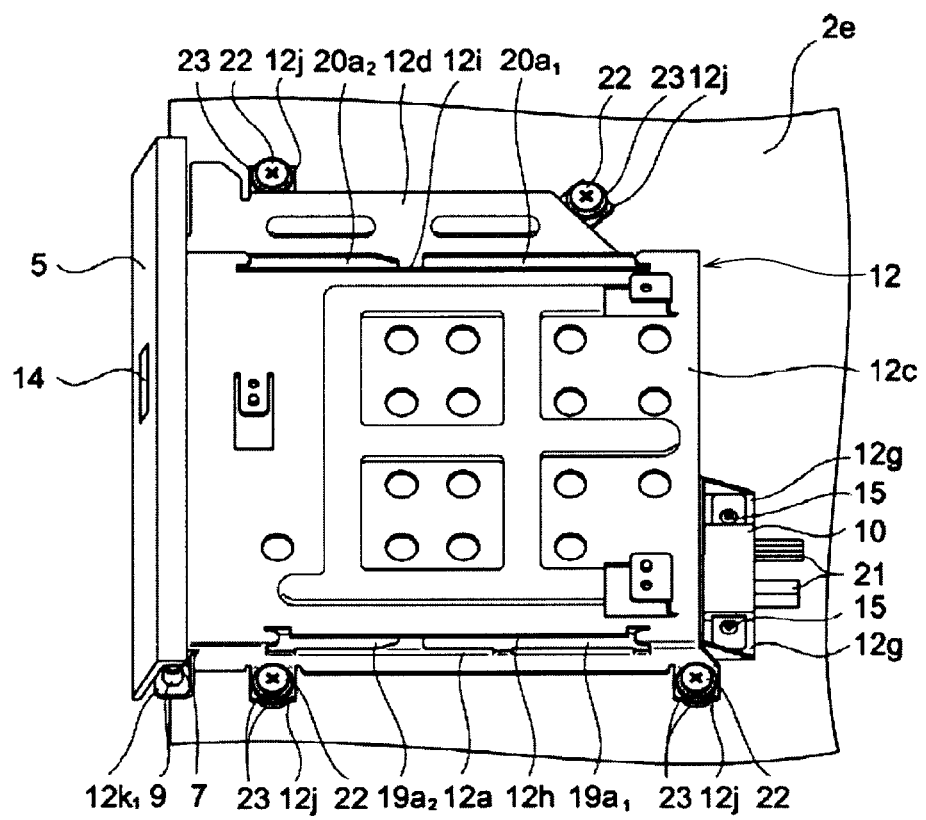
FIG. 8 illustrates the frame and the disk drive which are fixed to a casing.
Figure 8:
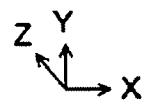

FIG. 8 illustrates the manner in which the frame 12 with the disk drive 4 fixed thereto is fixed to the casing 2. The frame 12 is fixed to the casing 2 by the frame fixing parts 12*j*. As shown in the figure, the frame 12 is screwed to the bottom surface 2*e* of the casing 2 by frame fixing screws 22 passed through the frame fixing parts 12*j*. The bottom surface 2*e* is a surface on the back side of the face-side surface 2*a*, and is substantially parallel to the X-Y plane. The frame fixing screws 22 are fitted in the frame fixing parts 12*j* and fastened to the casing 2, in the condition where an elastic member 23 is interposed between the casing 2 and each frame fixing part 12*j* and also between each frame fixing part 12*j* and the head of each frame fixing screw 22. This ensures that transmission of vibrations between the frame 12 and the casing 2 is prevented, and the disk drive 4 can be protected from vibrations arising from a speaker or the like accommodated in the information processing device 1.

<Operation, etc.>

As above-mentioned, the disk drive 4 is fixed to the frame 12 by the drive fixing screws 7, and the frame 12 is fixed to the casing 2 by the frame fixing screws 22. As shown in FIG. 2A, the drive fixing screws 7 are exposed from the opening 2*d* in the condition where the disk tray 6 is ejected, and can therefore be removed on the side of the back-side surface 2*b* of the casing 2. In the condition where the disk tray 6 is accommodated, the drive fixing screws 7 are not exposed to the appearance of the information processing device 1, so that they can fix the disk drive 4 to the casing 2 without impairing the appearance.

Figure 9:
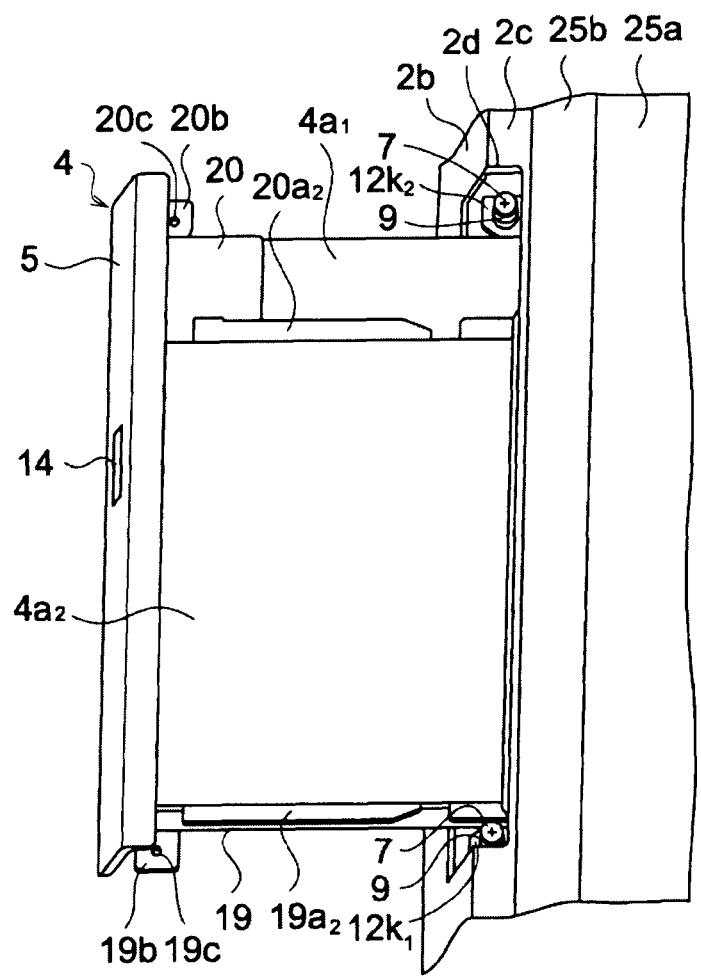
FIG. 9 illustrates the disk drive demounted from the casing.

FIG. 9 is a perspective view showing the casing 2 and the disk drive 4. As shown in the figure, with the disk drive 4 drawn out in the X-direction in the condition where the drive fixing screws 7 are removed, the disk drive 4 can be demounted from the casing 2. At the time of again mounting the disk drive 4, the disk drive 4 is inserted into the frame 12, and the drive fixing screws 7 are fastened, whereby the disk drive 4 can be mounted to the casing 2. Thus, by detaching and attaching the drive fixing screws 7 through the opening 2*d*, the disk drive 4 can be replaced easily.

Besides, by coupling the frame 12 and the disk drive main body 4A to each other by the drive fixing screws 7 on both sides of the disk tray 6, fixation of the disk drive main body 4A to the frame 12 can be made firm. In addition, with the drive fixing screws 7 arranged in the direction perpendicular to the bottom surface, a tool such as a screw driver can be prevented from interfering with the disk tray 6 at the time of tightening or untightening the drive fixing screws 7.

<Inside Structure of Information Processing Device 1>

Now, the inside structure of the information processing device 1 will be described below.

Figure 10:
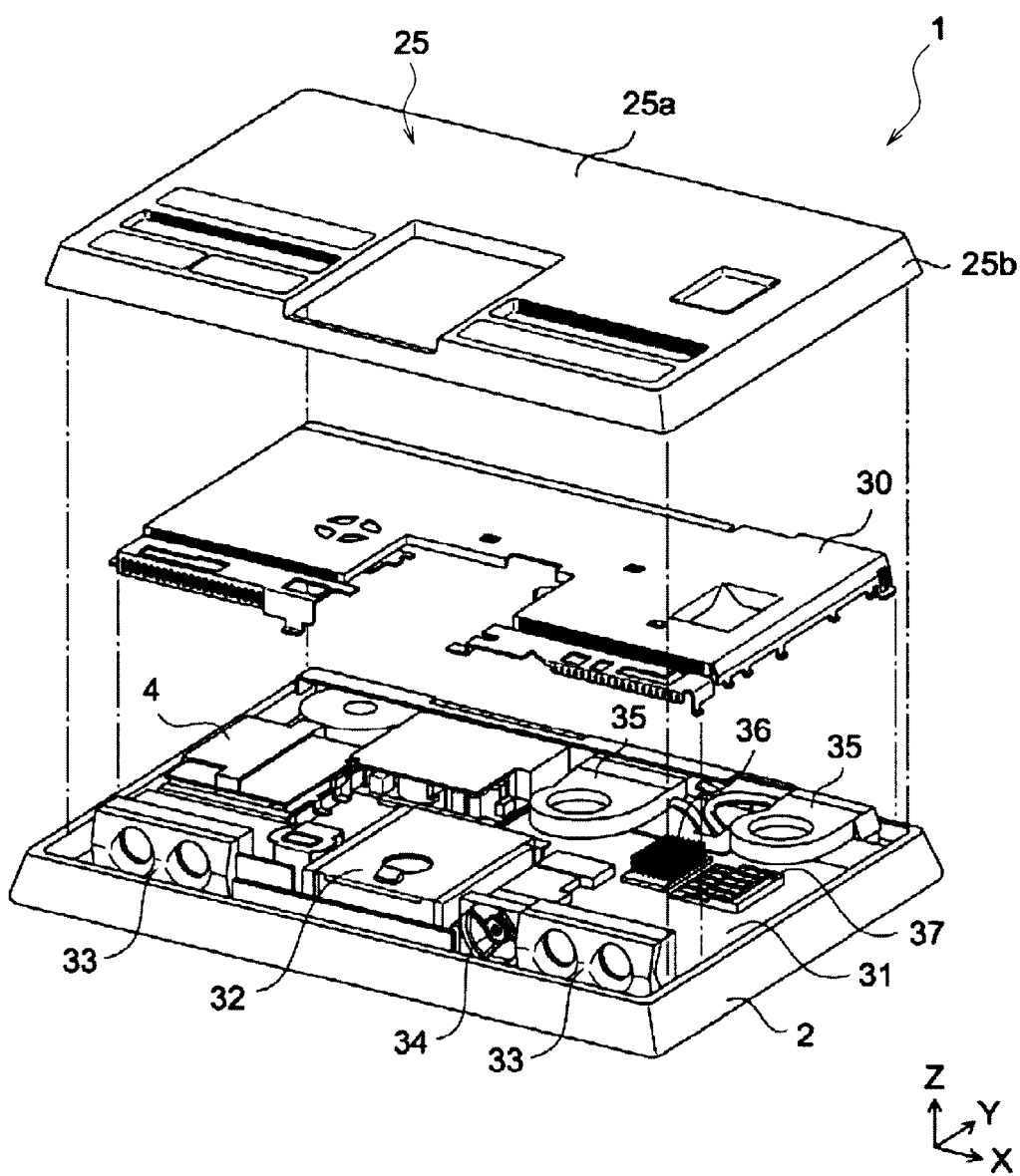
FIG. 10 illustrate an inside structure of the information processing device.

FIG. 10 is an exploded perspective view showing the inside structure of the information processing device 1. As shown in the figure, devices such as the disk drive 4, a main substrate 31, an HDD (Hard Disk Drive) 32, a speaker 33, a ventilation fan 34, and a cooling fan 35 are disposed inside the casing 2. A CPU (not shown), a CPU heat sink 36, a memory 37 and the like are mounted on the main substrate 31. In addition, the information processing device 1 has a shield plate 30. The shield plate 30 is disposed between a rear cover 25 and the casing 2, and prevents the EMI concerning the devices accommodated in the casing 2. The main substrate 31 and the shield plate 30 are disposed substantially in parallel to the X-Y plane.

Figure 11:
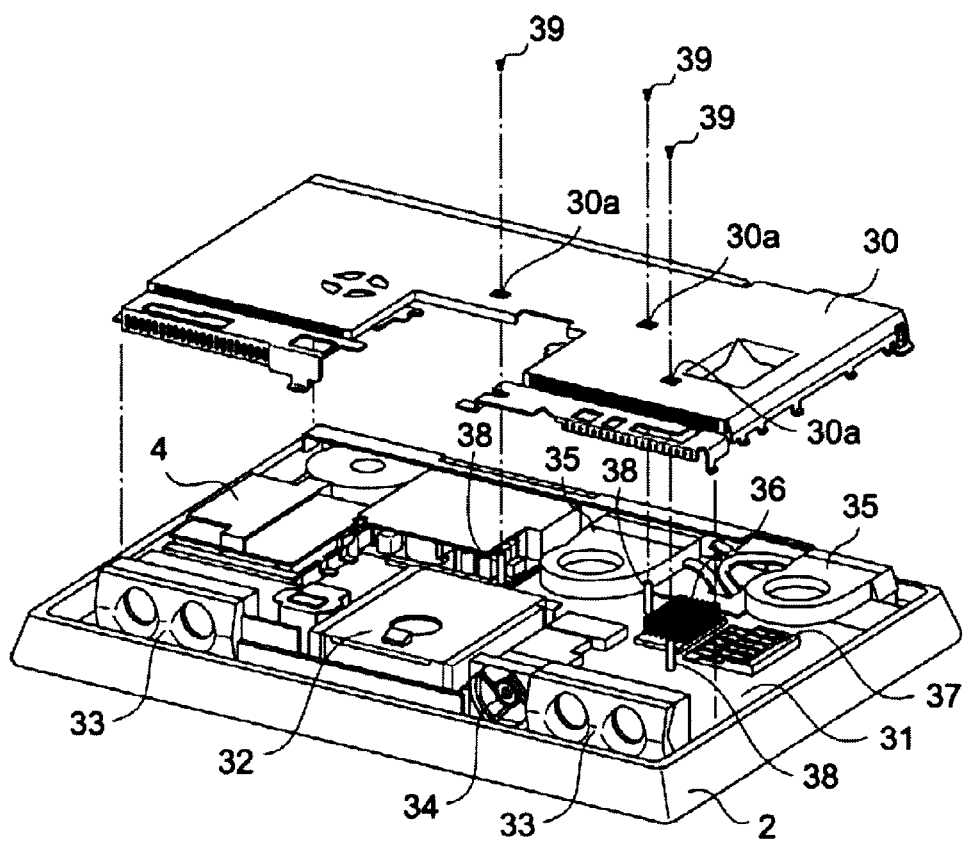
FIG. 11 illustrates a method of mounting a shield plate to the casing.
Figure 11:
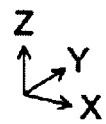

FIG. 11 illustrates a method of mounting the shield plate 30 to the casing 2.

The shield plate 30 is fixed by screws 39 to hexagon studs 38 engaged with the casing 2. The shield plate 30 is provided with through-holes 30a through which the screws 39 are passed. The hexagon studs 38 are engaged with the casing 2 through the main substrate 31, and are so disposed that their axes are oriented in the Z-direction. The shield plate 30 is fixed to the hexagon studs 38 at, for example, three positions.

Figure 12A:
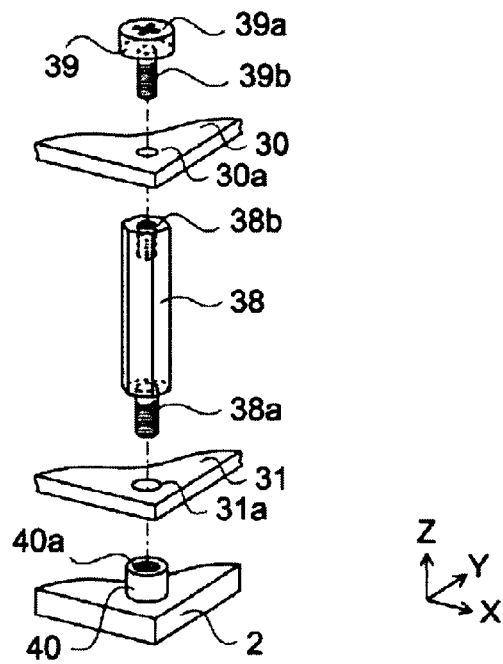
FIGS. 12A and 12B illustrate a method of mounting a main substrate and the shield plate to the casing and structures of them.
Figure 12B:
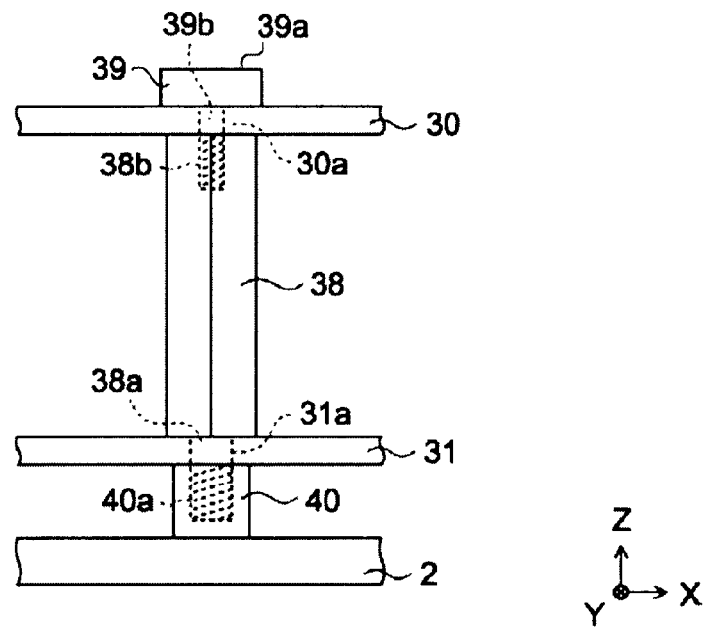

FIGS. 12A and 12B illustrate the manner in which the main substrate 31 and the shield plate 30 are mounted to the casing 2. FIG. 12A is an exploded perspective view of the vicinity of the hexagon stud 38, and FIG. 12B is a sectional view of the vicinity of the hexagon stud 38 by which the main substrate 31 and the shield plate 30 are fixed. As shown in the figure, the casing 2 is provided with boss parts 40. The boss part 40 is provided therein with a screw hole 40a, which is formed with a screw thread. The main substrate 31 (first component part) is provided with through-holes 31a through which the screw shafts 38a of the hexagon studs 38 are to be passed.

The hexagon stud 38 is in the shape of a hexagonal prism, and is provided, at its one end portion, with the screw shaft 38a formed with a screw thread. The screw shaft 38a is formed concentrically with the axis of the hexagon stud 38, and is so sized as to pass through the through-hole 31a to make screw engagement with the screw hole 40a. The screw shaft 38a and the screw hole 40a may have a size of, for example, M4 (ISO standard). The hexagon stud 38 is provided, at its other end portion, with a screw hole 38b formed with a screw thread. The screw hole 38b is formed concentrically with the longitudinal axis of the hexagon stud 38.

The shield plate 30 (second component part) is provided with the through-holes 30a through which the screw shafts 39b of the screws 39 are to be passed. The screw 39 has a screw head 39a and the screw shaft 39b. The screw shaft 39b is so sized as to pass through the through-hole 30a to make screw engagement with the screw hole 38b. The screw shaft 39b and the screw hole 38b may be smaller in size than the screw shaft 38a and the screw hole 40a; for example, the screw shaft 39b and the screw hole 38b may have a size of M2.

The hexagon stud 38 is fixed to the boss part 40 through the main substrate 31, by putting the screw shaft 38a into screw engagement with the screw hole 40a in the boss part 40 in the condition where the screw shaft 38a is passed through the through-hole 31a in the main substrate 31. The main substrate 31 is fixed by being clamped between the boss parts 40 and the hexagon studs 38. The screw 39 is fixed to the hexagon stud 38 through the shield plate 30, by screwing the screw shaft 39b into the screw hole 38b in the hexagon stud 38 in the condition where the screw shaft 39b is passed through the through-hole 30a in the shield plate 30. The shield plate 30 is fixed by being clamped between the hexagon studs 38 and the screws 39.

<Operation, etc.>

With the main substrate 31 and the shield plate 30 fixed to the casing 2 in the above-mentioned manner, the rigidity of the shield plate 30 can be enhanced. The shield plate 30 can be supported on the casing 2, not only at its outer edge portions put in direct contact with the casing 2 but also at its central portion. In addition, where the shield plate 30 and the hexagon studs 38 are conductors, the shield plate 30 can be used as a ground by way of the hexagon studs 38, thereby suppressing the radiation of electromagnetic waves from the devices.

A process for demounting the shield plate 30, which has been fixed as above-mentioned, from the hexagon studs 38 and hence from the casing 2 by releasing the screws 39 from the screw engagement will be described. In order to demount the shield plate 30, it suffices to rotate the screws 39 in an untightening direction, thereby releasing the screw engagement between the screw shafts 39b and the screw holes 38b. Here, in this embodiment, the size of the screw shaft 39b is smaller than the size of the screw shaft 38a, so that the torque required to release the screw engagement is greater for the screw shaft 38a than for the screw shaft 39b. Therefore, when the screw 39 is rotated in the untightening direction, only the screw engagement between the screw shaft 39b and the screw hole 38b is released, without releasing the screw engagement between the screw shaft 38a and the screw hole 40a.

If the screw shaft 38a and the screw shaft 39b are comparable in size, there may be cases where the torque required to release the screw engagement between the screw shaft 38a and the screw hole 40a is smaller than the torque required to release the screw engagement between the screw shaft 39b and the screw hole 38b. An example of such cases is a case where the screw shaft 39b and the screw hole 38b are firmly attached to each other due to rusting or the like. If a torque in the direction for releasing the screw engagement of the screw 39 is exerted in such a situation, the screw engagement between the screw shaft 38a and the screw hole 40a would be released while the screw shaft 39b and the screw hole 38b would be kept in screw engagement.

If the screw engagement between the screw shaft 38a and the screw hole 40a is released, the hexagon stud 38 would be detached from the casing 2, together with the shield plate 30. Since the main substrate 31 is also fixed to the boss parts 40 by the hexagon studs 38, the fixation between the main substrate 31 and the casing 2 may be released, possibly resulting in a trouble with a wiring or the like mounted as a component part. In this embodiment, it is ensured that the fixation of the main substrate 31 can be prevented from being released at the time of demounting the shield plate 30.

While an exemplary configuration in which the screw shaft 38a has a size of M4 and the screw shaft 39b has a size of M2 has been described above, this is not limitative. For instance, the sizes of the screw shaft 38a and the screw shaft 39b may be M3 and M2, respectively. Or, the sizes of the shaft screw 38a and the screw shaft 39b may be M4 and M3, respectively. In these cases, the screw shafts 38a and 39b are close to each other in size, so that the difference therebetween in the torque required for releasing the screw engagement is small. Therefore, the torque needed to release the screw engagement between the screw shaft 38a and the screw hole 40a may be increased by, for example, fitting the screw shaft 38a with a spring washer or coating the screw shaft 38a with a screw fixing agent. Or, alternatively, the rotating direction for screw engagement between the screw shaft 38a and the screw hole 40a and the rotating direction for engagement between the screw shaft 39b and the screw hole 38b may be set opposite to each other. In this case, even if an excessive torque in the direction for releasing the screw engagement between the screw shaft 39b and the screw hole 38b is applied to the screw 39, the screw engagement between the screw shaft 38a and the screw hole 40a is strengthened, so that the engagement is prevented from being released.

(Second Embodiment)

Now, an information processing device 1 according to a second embodiment of the present invention will be described.

<Configuration of Information Processing Device>

Figure 13:
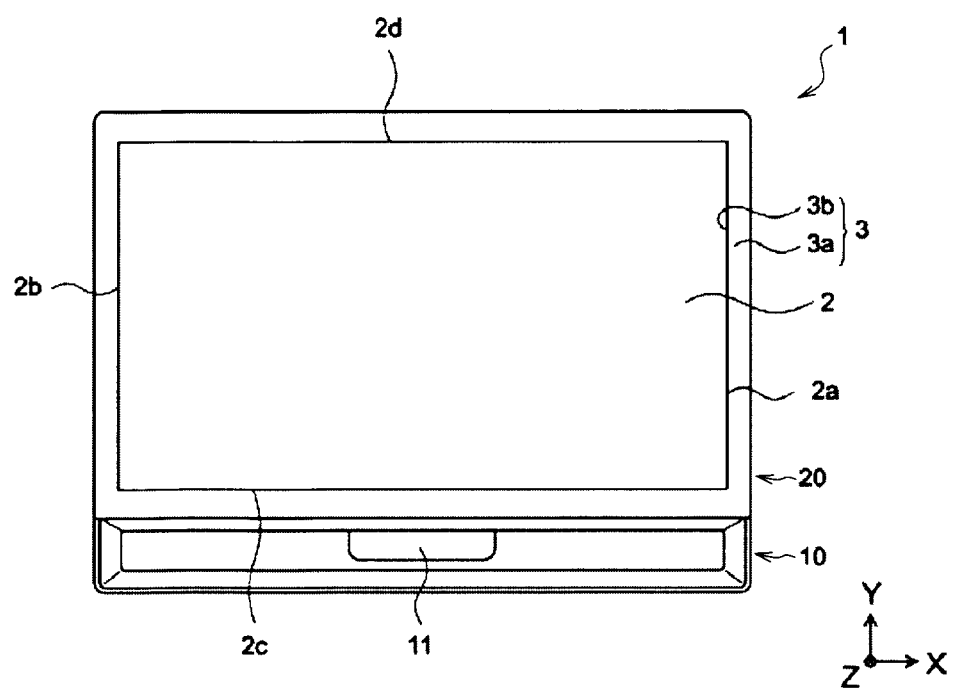
FIG. 13 is a plan view showing an appearance of an information processing device according to a second embodiment of the invention.

FIG. 13 is a plan view showing an appearance of the information processing device 1 according to the second embodiment.

Figure 14:
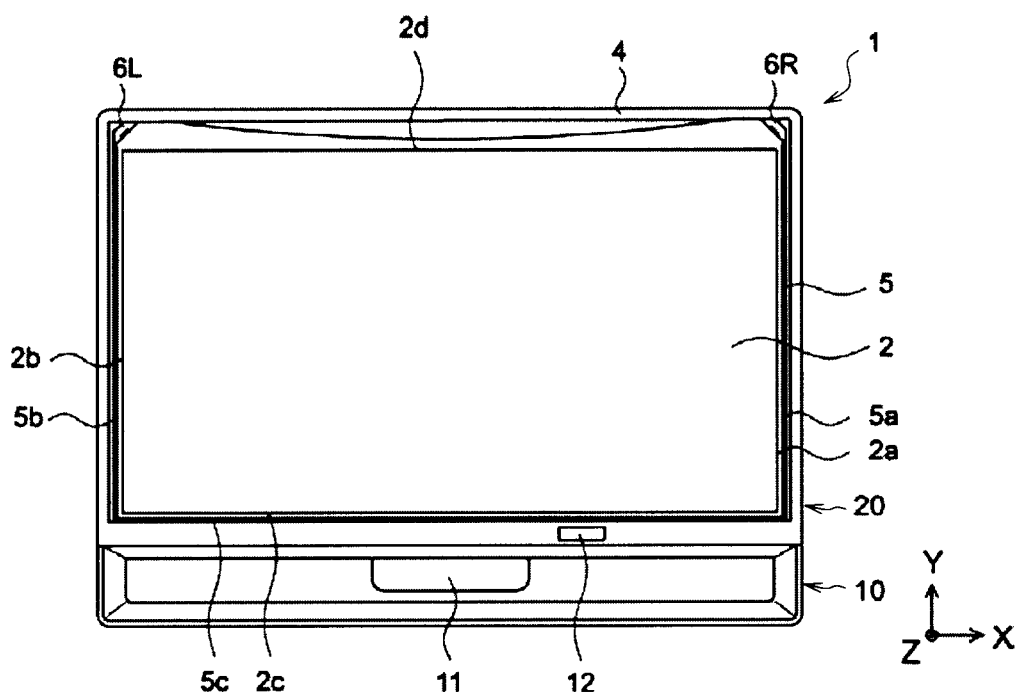
FIG. 14 is a plan view showing the condition where a bezel has been removed from the information processing device.

FIG. 14 is a plan view showing the condition where a bezel 3 has been removed from the information processing device 1.

As shown in these figures, the information processing device 1 includes a support part 10 and a main body part 15. The support part 10 is provided beneath the main body part 15, and supports the main body part 15. The support part 10 is provided therein with a space, in which a keyboard and the like can be accommodated. In addition, the information processing device 1 has a stand 11 provided on the side of its back-side surface.

The main body part 15 includes a screen 2, a bezel 3, a casing 4, a reflecting member 5, and detectors 6. One direction parallel to the plane of the screen 2 will be referred to as X-direction, a direction parallel to the plane of the screen 2 and perpendicular to the X-direction will be referred to as Y-direction, and a direction perpendicular to both the X-direction and the Y-direction will be referred to as Z-direction. Thus, the screen 2 is a surface parallel to the X-Y plane. The side on which the screen 2 of the information processing device 1 is appearing as shown in FIG. 13 will be referred to as the front side of the information processing device 1, and the opposite side will be referred to as the back side of the information processing device 1.

The casing 4 accommodates a display and other various devices constituting the information processing device. The screen 2 is the surface of the display (display unit) on which images are displayed. Examples of the display include an LCD (Liquid Crystal Display) and a CRT (Cathode Ray Tube). The screen 2 is also a surface on which pointing (designation) by the user is conducted. The screen 2 of the information processing device 1 is rectangular in shape in this embodiment, but this shape is not limitative. Of the four edges of the screen 2, one is referred to as a first edge 2a, and an edge opposite to the first edge 2a is referred to as a second edge 2b. Of the remaining two edges, one is referred to as a third edge 2c, and the other as a fourth edge 2d.

The bezel 3 is a frame which decoratively surrounds the peripheral four edges of the screen 2.

Figure 17:
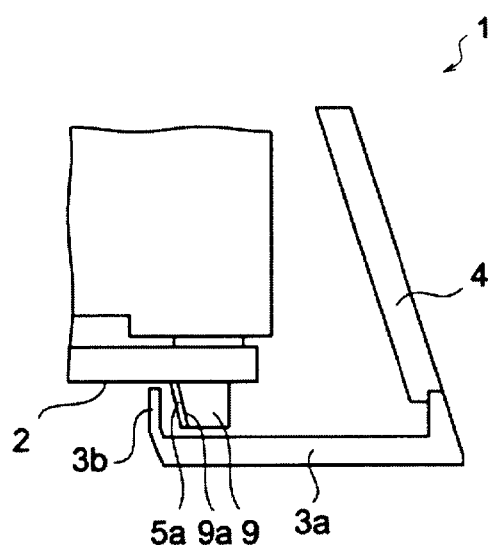
FIG. 17 is a plan view showing the layout of the bezel.
Figure 17:
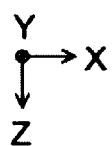

FIG. 17 is a sectional view showing the layout of the bezel 3. The bezel 3 includes a first part 3a fronting on the front side of the information processing device 1, and a second part 3b extended from the first part 2a so as to shield the detectors 6 and the reflecting member 5. As shown in FIG. 17, the first part 3a of the bezel 3 fronts on the front side of the information processing device 1, and is supported by the casing 4. The second part 3b is extended from the screen 2 side of the first part 3a. The second part 3b is provided along those of the four edges of the screen 2 at which the reflecting member 5 (described later) is provided, namely, along the first edge 2a and the second edge 2b and the third edge 2c. The first part 3a may have a thickness of, for example, 2.0 to 3.0 mm. The second part 3b may have a thickness of, for example, 0.5 to 2.0 mm.

The bezel 3 is formed from a selectively transmitting material. The selectively transmitting material herein means a material of which the light transmittance varies depending on wavelength. The selectively transmitting property of the material constituting the bezel 3 is so set that light in the wavelength band of the light radiated from the detectors 6 is transmitted through the bezel 3 and that the quantity of light in the visible region transmitted through the bezel 3 is limited. For instance, a configuration may be adopted in which the detectors 6 radiate infrared light having a wavelength of 850 nm, and a selectively transmitting material permitting selective transmission therethrough of infrared light having a wavelength of 850 nm is used to form the bezel 3.

Figure 20:
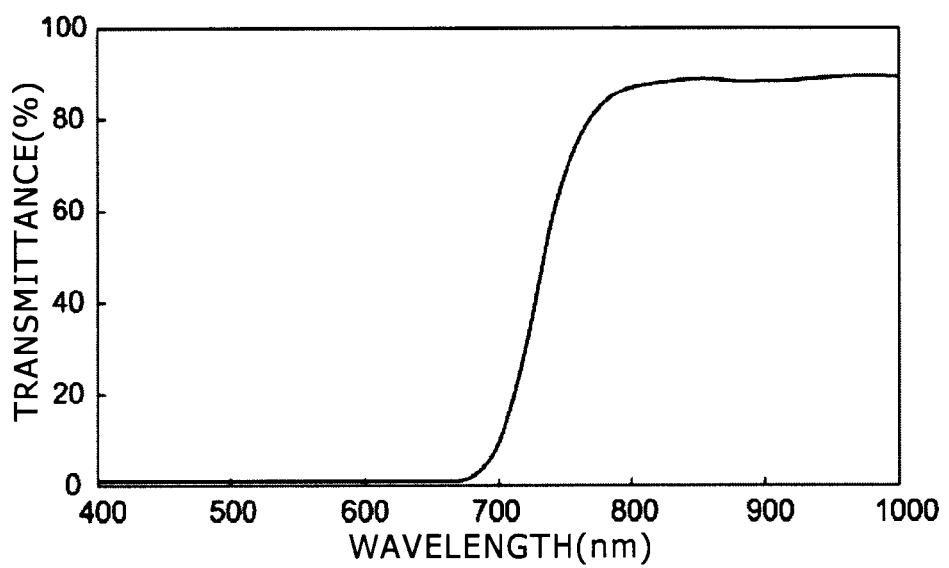
FIG. 20 is a graph showing the spectral transmittance of a selectively transmitting material.

FIG. 20 is an example of spectral transmittance data on a specified selectively transmitting material which can be used to form the bezel 3. The spectral transmittance data was obtained by measurement for a bezel 3 of which the second part 3b has a thickness of 2.0 mm. As shown in the figure, in the case of this selectively transmitting material, transmission of light having a wavelength in a visible wavelength band of not more than about 700 nm can be limited, whereas light in a wavelength band of not less than 700 nm can be selectively transmitted.

As shown in FIG. 14, a receiver part 12 is provided in the information processing device 1. The receiver part 12 receives an optical signal for operating the information processing device 1 by a remote controller from the exterior. The optical signal is a blinking signal of light in an invisible region such as infrared light, and is converted into an electrical signal by the receiver part 12. The receiver part 12 should be covered with a cover operable to shield visible light, for the purpose of preventing malfunction of the receiver part 12 from occurring due to visible light. Here, since the bezel 3 is formed of a material operable to limit the quantity of light in visible region transmitted therethrough, the first part 3a of the bezel 3 can be utilized as the cover for the receiver part 12.

Returning to FIGS. 13 and 14, the reflecting member 5 has a retroreflective ability, and reflects the light emitted from the detectors 6. The retroreflective ability is an ability to reflect incident light in the same direction as the direction of incidence. The reflecting member 5 is provided along three of the four edges of the screen 2. In this embodiment, the reflecting member 5 is assumed to be provided along the first edge 2a, the second edge 2b and the third edge 2c. Of the reflecting member 5, the part along the first edge 2a is referred to as a first part 5a, the part along the second edge 2b is referred to as a second part 5b, and the part along the third edge 2c is referred to as a third part 5c. The reflecting member 5 is belt-like in shape, and is attached to a support member 9 (see FIGS. 15 and 17) disposed along the first edge 2a, the second edge 2b and the third edge 2c of the peripheral four edges of the screen 2. The support member 9 is provided, for example, on the front side of a protective panel or the like disposed at the foremost surface of the screen 2. The support member 9 has an inner wall surface 9a along a direction including a component orthogonal to the screen 2, and the support member 5 is supported on the inner wall surface 9a.

As above-mentioned, the support member 9 is provided at the foremost surface of the screen 2, and the front side of the support member 9 is covered by the bezel 3, so that the support member 9 is accommodated in the bezel 3 on an apparent basis. Describing more the positional relationship between the support member 9 and the bezel 3, a gap is secured between an end portion on the front side of the support member 9 and the back-side surface of the bezel 3. Therefore, even when the bezel 3 is deformed by an external force or heat or the like, the possibility that the deformation might influence the reflecting member 5 is reduced.

The detector 6 radiates light along the screen 2, and detects the light reflected by the reflecting member 5. Two such detectors 6 are used in the information processing device 1. The two detectors 6 are disposed, for example, respectively at a left upper corner and a right upper corner of the screen 2. In other words, the two detectors 6 are provided respectively at the portions of corners formed between the edge along which the reflecting member 5 is not provided and the adjacent edges, that is, at the portion of the corner formed between the first edge 2a and the fourth edge 2d and at the portion of the corner formed between the second edge 2b and the fourth edge 2d. Hereafter, the detector 6 provided at the corner formed between the first edge 2a and the fourth edge 2d (the right upper corner of the screen 2) will be referred to as "first detector 6R," and the detector 6 provided at the corner formed between the second edge 2b and the fourth edge 2d (the left upper corner of the screen 2) will be referred to as "second detector 6L." Details of the structure of the detector 6 will be described later.

Incidentally, the positions of the two detectors 6 are not limited to the corner portions of the screen 2. For example, it suffices for the detectors 6 to be disposed at mutually spaced positions on the fourth edge 2d.

Figure 15:
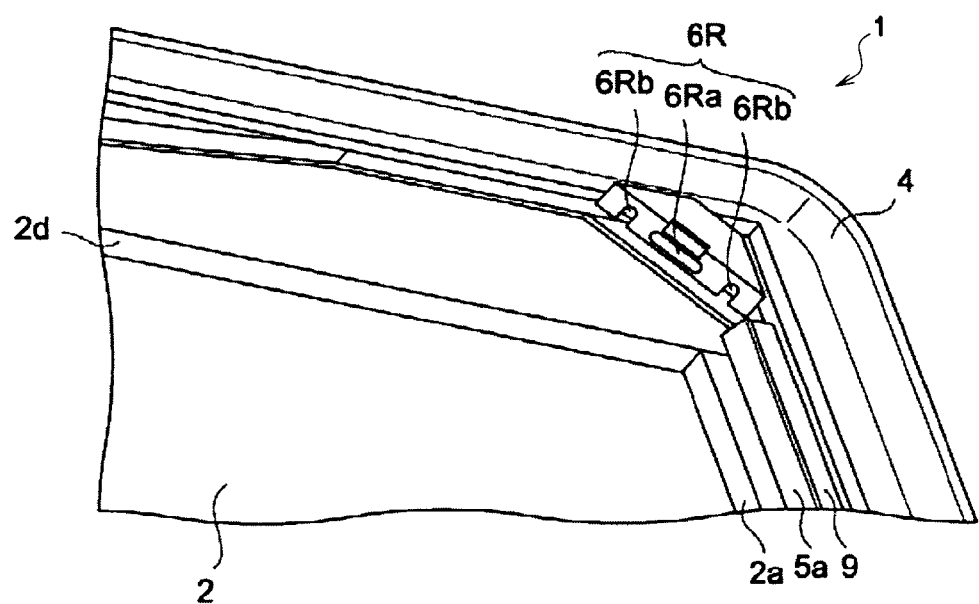
FIG. 15 is a perspective view showing details of a detector.
Figure 15:
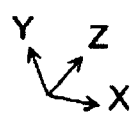

FIG. 15 is a perspective view showing the details of the detector 6. While the first detector 6R disposed at the right upper corner of the screen 2 is shown in FIG. 15, the second detector 6L also is configured in the same fashion. As shown in the figure, the first detector 6R includes an emitter 6Ra and a receiver 6Rb.

The emitter 6Ra emits light along the screen 2. The emitter 6Ra includes a light source, an optical system operable to converge the light emitted from the light source, and a scanning mechanism operable to scan the light converged by the optical system. The light source is an LED (Light Emitting Diode), an LD (Laser Diode) or the like, and generates light having a wavelength in an invisible region (the infrared region or the ultraviolet region). The optical system is a lens or lenses or the like. The scanning mechanism is a galvano-scanner, a polygon scanner or the like, and is so configured as to be capable of scanning the incident light in a predetermined range.

The emitter 6Ra emits the light toward the reflecting member 5 while periodically changing the axial direction of the light within a predetermined angular range (e.g., 90°) by the scanning mechanism. Specifically, in FIGS. 14 and 18, the emitter 6Ra mounted on the first detector 6R radiates the light toward the second part 5b and the third part 5c of the reflecting member 5 in a scanning manner. The emitter 6La of the second detector 6L radiates the light toward the first part 5a and the third part 5c of the reflecting member 5 in a scanning manner.

The receiver 6Rb receives the light emitted from the emitter 6Ra (mounted on the same detector 6) and returning from the reflecting member 5, and outputs an electrical signal according to the intensity of the light received. The output of the receiver 6Rb is transmitted to a coordinate detecting unit 7 which will be described later.

Incidentally, in this embodiment, as shown in FIG. 15, one first detector 6R has two receivers 6Rb, 6Rb disposed on both sides of the emitter 6Ra, for supplementing the detectable range.

Figure 16:
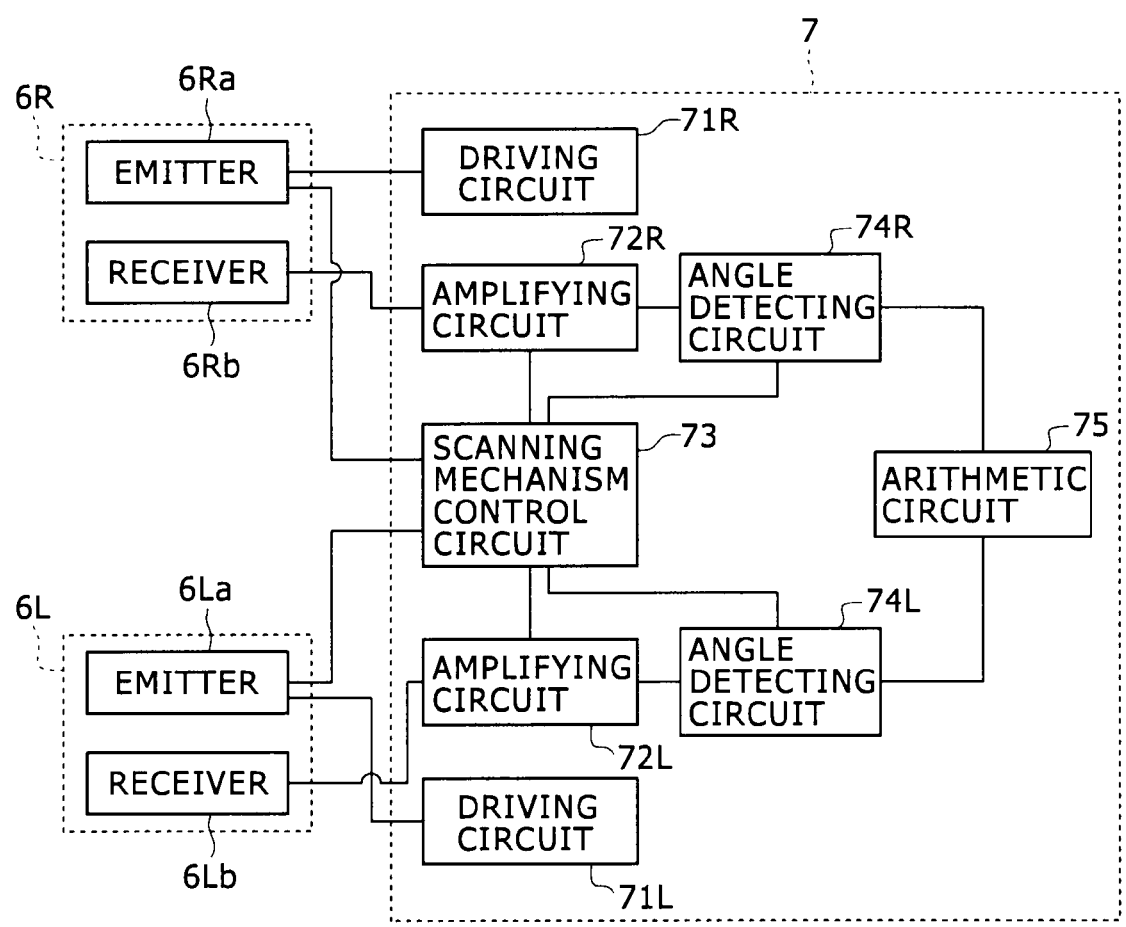
FIG. 16 is a block diagram showing the configuration of a coordinate detecting unit.

FIG. 16 is a block diagram showing the configuration of the coordinate detecting unit 7.

The information processing device 1 has the coordinate detecting unit 7 operable to detect the coordinates of the position pointed on the screen 2, based on the detection results obtained by the two detectors 6.

As shown in the figure, the coordinate detecting unit 7 includes driving circuits 71 (driving circuit 71R, driving circuit 71L), amplifying circuits 72 (amplifying circuit 72R, amplifying circuit 72L), a scanning mechanism control circuit 73, angle detecting circuits 74 (angle detecting circuit 74R, angle detecting circuit 74L), and an arithmetic circuit 75. Here, the circuits denoted by numerals accompanied by R are circuits corresponding to the system of the first detector 6R, and the circuits denoted by numerals accompanied by L are circuits corresponding to the system of the second detector 6L.

The driving circuit 71R supplies the light source of the emitter 6Ra with a driving current. Similarly, the driving circuit 71L supplies the light source of the emitter 6La with a driving current.

The amplifying circuit 72R amplifies an output from the receiver 6Rb, and outputs the amplified signal to the angle detecting circuit 74R. Similarly, the amplifying circuit 72L amplifies an output from the receiver 6Lb, and outputs the amplified signal to the angle detecting circuit 74R.

The scanning mechanism control circuit 73 controls respective scanning mechanisms in the emitter 6Ra and the emitter 6La.

The angle detecting circuit 74R detects the timing of a maximum lowering in the amplified output of the receiver 6Rb, or the output of the amplifying circuit 72R, based on a scan timing reference signal supplied from the scanning mechanism control circuit 73, and outputs the thus detected timing after converting it into angle information. Here, the scan timing reference signal supplied from the scanning mechanism control circuit 73 is, for example, a signal outputted from the scanning mechanism control circuit 73 to the angle detecting circuit 74R at the time when the scan angle of the scanning mechanism is 0 degrees. The angle detecting circuit 74R determines the difference between the timing of inputting of the scan timing reference signal and the timing of the maximum lowering in the output of the receiver 6Rb, and converts the difference into angle information. Specifically, in the case where the axis of the light is set to become parallel to the first edge 2a of the screen 2 when the scan angle of the scanning mechanism is 0 degrees, the angle formed between a straight line connecting the coordinates pointed on the screen 2 by the user with the first detector 6R and the first edge 2a (straight line) of the screen 2 is determined as first angle information. Then, the angle detecting circuit 74R outputs the thus obtained angle information to the arithmetic circuit 75. Like the angle detecting circuit 74R, the angle detecting circuit 74L also detects the timing of a maximum lowering in the amplified output of the receiver 6Lb, or the output of the amplifying circuit 72L, based on a scan timing reference signal supplied from the scanning mechanism control circuit 73, converting the thus detected timing into second angle information, and outputs the second angle information to the arithmetic circuit 75. The angle determined in this manner is the angle formed between a straight line connecting the coordinates pointed on the screen 2 by the user with the second detector 6 and the second edge 2b (straight line) of the screen 2.

The arithmetic circuit 75 detects the coordinates of a position pointed on the screen 2 by the user, based on the two pieces of angle information inputted from the angle detecting circuit 74R and the angle detecting circuit 74L.

<Coordinate Detecting Operation>

A coordinate detecting operation carried out by the information processing device 1 configured as above will now be described.

Figure 18:
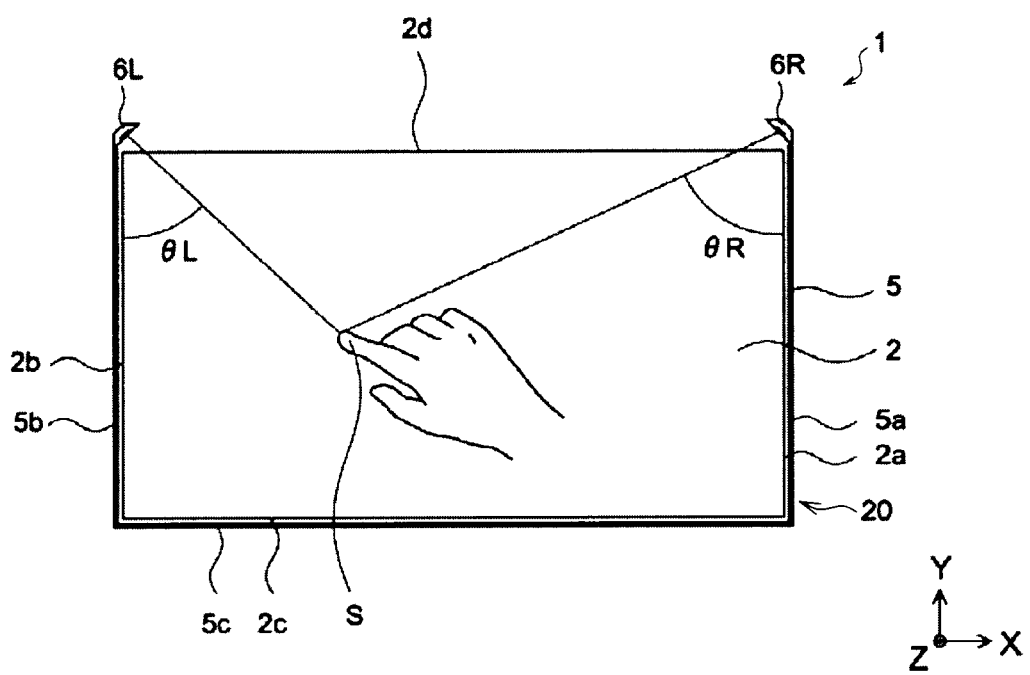
FIG. 18 is a schematic view illustrating a detecting operation.

FIG. 18 is a schematic view for illustrating the coordinate detecting operation.

When a user's finger or a stylus pen or the like touches (comes into proximity to) the screen 2, the coordinates of the touch position is detected by the first detector 6R, the second detector 6L and the coordinate detecting unit 7 in the following manner.

First, the operation of the first detector 6R will be described.

The light source of the emitter 6Ra is supplied with a driving current from the driving circuit 7, light having a specified wavelength is emitted from the emitter 6Ra, and the scanning mechanism for the emitter 6Ra is supplied with a control signal from the scanning mechanism control circuit 73. As a result, the scanning mechanism is driven, and the light emitted from the light source is radiated in a scanning manner.

The light having been emitted from the emitter 6Ra and having traveled over the screen 2 is transmitted through the second part 3b of the bezel 3 formed of the selectively transmitting material, to reach the reflecting member 5, and is reflected by the reflecting member 5. Here, since the reflecting member 5 has a retroreflective ability, the light incident on the reflecting member 5 is reflected in the same direction as the direction of incidence, that is, in the direction toward the first detector 6R. The light reflected by the reflecting member 5 is transmitted through the second part 3b of the bezel 3, to reach the detector 6.

In the case where an interceptive body S pointing a position on the screen 2 is present, the beam radiated toward the interceptive body S, of the light radiated from the emitter 6Ra in a scanning manner, is blocked by the interceptive body S. As a result, the beam in this instance does not reach the reflecting member 5, so that the quantity of light received by the receiver 6Rb is lowered in this moment. Therefore, the output from the amplifying circuit 72R is also lowered in this moment, and, accordingly, the first angle information is obtained by the angle detecting circuit 74R, based on the difference between the timing of the lowering in this output and the timing of the scan timing reference signal supplied from the scanning mechanism control circuit 73. The angle detected by the angle detecting circuit 74R is represented by R.

The second detector 6L also operates in the same manner as the first detector 6R, whereby the second angle information is obtained. This angle is represented by L.

The arithmetic circuit 75 determines the coordinates of the position of the interceptive body S on the screen 2, from the angle θR outputted from the angle detecting circuit 74R and the angle θL outputted from the angle detecting circuit 74L.

As above-mentioned, although the reflecting member 5 is hidden by the second part 3b of the bezel 3, the bezel 3 is formed of a selectively transmitting material and, therefore, the transfer of light between the detector 6 and the reflecting member 5 is not hampered by the bezel 3. In addition, since the bezel 3 limits the quantity of visible light transmitted therethrough, the reflecting member 5 is invisible to the user.

<Adjustment of Receiver Gain>

Depending on the size of the gap between the reflecting member 5 and the second part 3b of the bezel 3, the surface condition of the bezel 3, the molded condition of the bezel 3 (irregularities on molding, etc.) and so on, light transmittance may vary from part to part. In view of this, the gain of the receivers is adjusted so as to solve this problem.

Figure 19A:
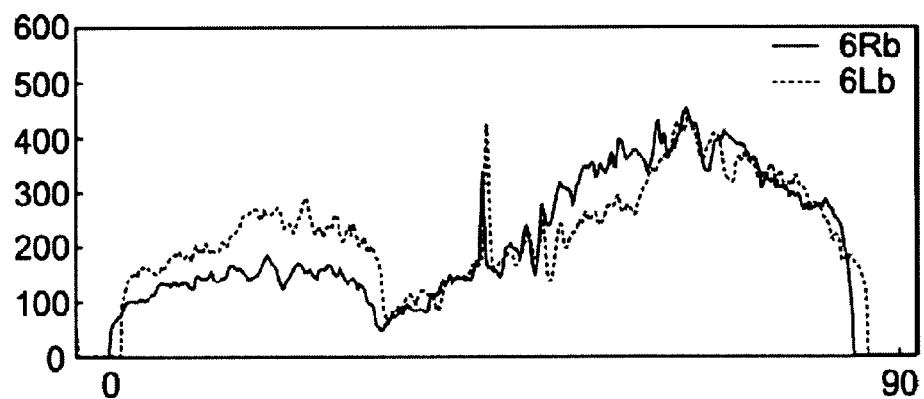
FIGS. 19A and 19B are each a graph showing a receiver gain.
Figure 19B:
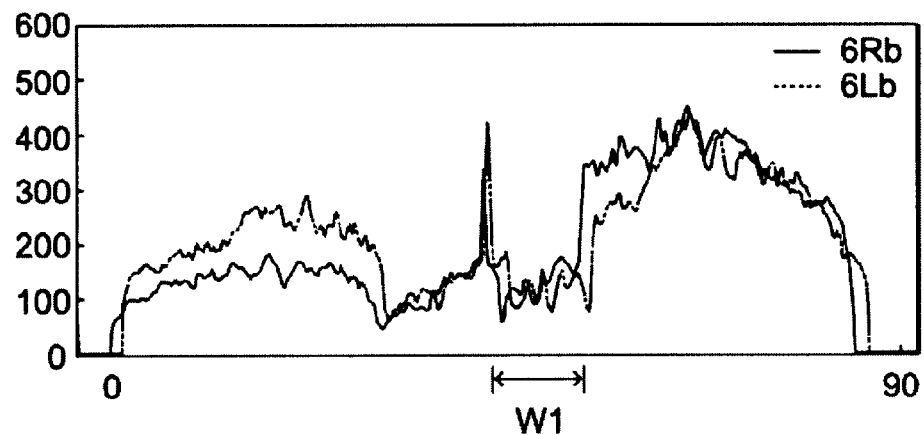

FIGS. 19A and 19B are graphs showing examples of an output from the receiver.

FIG. 19A shows a receiver output distribution when the reflecting member 5 is not covered with the bezel 3 formed of a selectively transmitting material, and FIG. 19B shows a receiver output distribution when the reflecting member 5 is covered with the bezel 3. In the figures, the solid-line plot indicates the output from the receiver 6Rb on one side, and the broken-line plot indicates the output from the receiver 6Lb on the other side. The axis of abscissas indicates the angle of the light beam, and the axis of ordinates indicates the output from the receiver.

A comparison between FIG. 19A and FIG. 19B shows that the both the outputs from the receivers 6Rb and 6Lb show attenuations, which are considered to arise from a lowering in light transmittance through the bezel 3, in the vicinity of an angle region denoted by W1 in the drawing. In view of this, it is desirable to preliminarily examine the angle range in which the outputs of both the receivers 6Rb and 6Lb are lowered below a threshold, and to raise the amplification factor (gain) of the amplifying circuits 72R and 72L for the outputs of the receivers 6Rb and 6Lb in this angle range. For example, at the time of starting the information processing device 1, a control unit drives the detectors 6 and the coordinate detecting unit 7 according to a program, examines the angle range in which the outputs of the receivers 6Rb and 6Lb are lowered below a threshold, and stores the examination results in a memory. Thereafter, the control unit, in actual coordinate detection, sets the angle range stored in the memory, and raises the amplification factor (gain) of the amplifying circuits 72R and 72L for the outputs of the receivers 6Rb and 6Lb in this angle range by a predetermined adjusting value.

As above-mentioned, according to the information processing device 1 in this embodiment, the following effects can be obtained.

In the information processing device 1, the bad influence of exposure of the reflecting member 5 on the appearance of the information processing 1 can be prevented, while enabling the transfer of light between the detectors 6 and the reflecting member 5, by the second part 3b of the bezel 3 which is formed of a selectively transmitting material and which limits the quantity of light in the visible region transmitted therethrough. In addition, it is possible to prevent the coordinate detection accuracy from being lowered due to contamination or damaging of the reflecting member 5. Further, the extension of the second part 3b from the first part 3a promises an enhancement of the strength of the bezel 3.

Besides, since the bezel 3 and the reflecting member 5 are supported independently, it is ensured that even where the bezel 3 is deformed due to an external force or heat or the like, the reflection of light by the reflecting member 5 is not influenced by the deformation, and the position of the interceptive body S can be detected accurately.

Furthermore, since the bezel 3 has a structure in which the first part 3a fronting on the front side of the information processing device 1 and the second part 3b covering the reflecting member 5 are formed integrally, it is possible to prevent penetration of dust or the like and to enhance design properties. In addition, the thickness of the second part 3b can be reduced while maintaining strength, whereby attenuation of light by the second part 3b can be reduced. Further, integral formation of the first part 3a and the second part 3b makes it possible to restrain an increase in the number of component parts and to reduce the number of steps for assembling the information processing device 1.

(Third Embodiment)

An information processing device 20 according to a third embodiment of the present invention will now be described.

The same configurations as those in the information processing device 1 according to the second embodiment above are denoted by the same symbols as used above, and descriptions of those configurations will be omitted.

The information processing device 20 differs from the information processing device 1 according to the second embodiment in the method of mounting the reflecting member 5.

Figure 21:
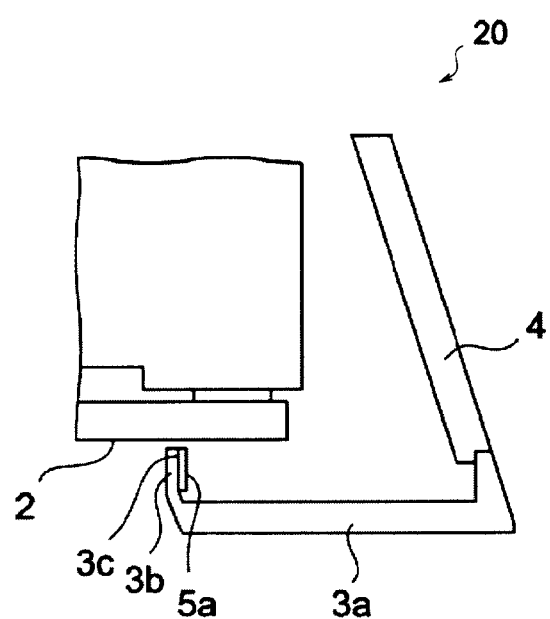
FIG. 21 is a sectional view showing the layout of a bezel of an information processing device according to the third embodiment of the invention.

FIG. 21 is a sectional view showing the layout of the bezel 3.

As shown in the figure, a first part 3a of the bezel 3 fronts on the front side of the information processing device 20, and is supported by a casing 4. A second part 3b is extended from the screen 2 side of the first part 3a. The second part 3b is provided along those edges of the screen 2 at which the reflecting member 5 is provided, that is, along the first edge 2a, the second edge 2b and the third edge 2c. The bezel 3 can be formed by integral molding of a selectively transmitting material. The reflecting member 5 is attached to the back side 3c of the second part 3b of the bezel 3.

The reflecting member 5 is adhered to the second part 3b with an adhesive. Here, the adhesive is a light transmitting one, whereby attenuation of light by the adhesive is restrained, and the accuracy in detection of the position of an interceptive body S can be enhanced.

Since the reflecting member 5 is fixed directly to the second part 3b of the bezel 3, influences of refraction of light by an air layer can be reduced. In addition, the optical path can be shortened and, hence, attenuation of light can be restrained, as compared with the case where a gap is present between the reflecting member 5 and the second part 3b of the bezel 3. Further, a reduction in the size of the bezel 3 can be promised, as compared with the case where the reflecting member 5 is fixed to the support member 9.

The present invention is not limited to the above-described embodiments, and various modifications are possible within the scope of the invention.

While two detectors have been provided in the information processing device in each of the above embodiments, the number of the detectors is not limited to two. Where more detectors are disposed, the accuracy in detecting the position of the pointing member (interceptive body) can be enhanced.

The present application contains subject matter related to that disclosed in Japanese Priority Patent Application JP 2009-205830 filed in the Japan Patent Office on Sep. 7, 2009, and Japanese Priority Patent Application JP 2009-230757 filed in the Japan Patent Office on Oct. 2, 2009, the entire contents of which are hereby incorporated by reference.

It should be understood by those skilled in the art that a variety of modifications, combinations, sub-combinations and alterations may occur, depending on design requirements and other factors as far as they are within the scope of the appended claims or the equivalents thereof.

What is claimed is:

1. An information processing device comprising: a casing including a side surface having an opening part and a bottom surface orthogonal to the side surface; a frame provided at the bottom surface; a disk drive main body configured to be attached to and detached from the frame through the opening part; a disk tray which is operable to hold a disk, is capable of being inserted into and drawn out of the disk drive main body through the opening part, and has a hatch operable to close the opening part when the disk tray is inserted in the disk drive main body; and a coupling part through which the frame and the disk drive main body are coupled to each other in the vicinity of the opening part, wherein the coupling part is covered with the hatch when the disk tray is inserted in the disk drive main body, and the coupling part is exposed when the disk tray is partially ejected from the disk drive main body, the frame has a pair of guide grooves formed along a direction in which the disk drive main body is attached to and detached from the frame through the opening part, and the disk drive main body has a pair of engaging parts that are engaged with the guide grooves; wherein the coupling part includes a first coupling part and a second coupling part, and the first coupling part and the second coupling part are disposed at both ends of the opening part which are on opposite sides of the disk tray; and wherein the coupling part has a screw to be passed through the disk drive main body and the frame, and the screw is passed in a direction perpendicular to the bottom surface.

2. The information processing device according to claim 1, wherein the frame is mounted to the bottom surface, with an elastic member interposed therebetween.

3. The information processing device according to claim 2, wherein
the coupling part further comprises a stud provided on the frame, a screw hole provided in the disk drive main body, and an urging member which is disposed between the screw and the stud and which is operable to urge the screw in a direction opposite to the direction in which the screw is inserted.

* * * * *